US010145577B2

(12) United States Patent
Bruck et al.

(10) Patent No.: US 10,145,577 B2
(45) Date of Patent: Dec. 4, 2018

(54) USER INTERFACES FOR HVAC SCHEDULE DISPLAY AND MODIFICATION ON SMARTPHONE OR OTHER SPACE-LIMITED TOUCHSCREEN DEVICE

(71) Applicant: Google LLC, Mountain View, CA (US)

(72) Inventors: Timo A. Bruck, Mountain View, CA (US); David Sloo, Menlo Park, CA (US); Clemens M. Knieper, San Francisco, CA (US)

(73) Assignee: Google LLC, Mountain View, CA (US)

( * ) Notice: Subject to any disclaimer, the term of this patent is extended or adjusted under 35 U.S.C. 154(b) by 803 days.

(21) Appl. No.: 14/530,497

(22) Filed: Oct. 31, 2014

(65) Prior Publication Data

US 2015/0058779 A1 Feb. 26, 2015

Related U.S. Application Data

(63) Continuation of application No. 13/624,875, filed on Sep. 21, 2012, now Pat. No. 8,893,032, which is a (Continued)

(51) Int. Cl.
*G06F 3/048* (2013.01)
*F24F 11/00* (2018.01)
(Continued)

(52) U.S. Cl.
CPC .......... *F24F 11/0086* (2013.01); *F24F 11/30* (2018.01); *G05D 23/1904* (2013.01);
(Continued)

(58) Field of Classification Search
None
See application file for complete search history.

(56) References Cited

U.S. PATENT DOCUMENTS 3,991,357 A 11/1976 Kaminski
4,183,290 A 1/1980 Kucharczyk
(Continued)

FOREIGN PATENT DOCUMENTS

CA 2202008 2/2000
DE 19609390 9/1997
(Continued)

OTHER PUBLICATIONS

Non-Final Office Action dated Nov. 19, 2015, for U.S. Appl. No. 13/434,560, 23 pages.
(Continued)

*Primary Examiner* — Kevin L Young
*Assistant Examiner* — Haimei Jiang
(74) *Attorney, Agent, or Firm* — Kilpatrick Townsend & Stockton LLP

(57) ABSTRACT

A novel small format touch screen user interface for displaying, adding and editing program setpoints is described. When editing a setpoint the user's input is constrained such that the user can only alter one parameter (either time or temperature). As soon as the user begins to drag a setpoint icon in either a horizontal (i.e. adjusting time), or vertical (i.e. adjusting temperature), the other parameter is constrained. Additionally, the disclosed user interface includes displaying information as to how the setpoint was most recently added or adjusted. For example the display can be used to indicate whether a setpoint was added or adjusted (1) on the thermostat itself; (2) by an automated learning algorithm; (3) by a user on a web client; or (4) by a user using a mobile client (such as a smart phone or tablet PC). Further, the name of the particular device is also displayed if known.

20 Claims, 20 Drawing Sheets

Related U.S. Application Data continuation-in-part of application No. 13/434,560, filed on Mar. 29, 2012, now Pat. No. 9,453,655.

(51) Int. Cl.
| | | |
|---|---|---|
| *F24F 11/30* | (2018.01) | |
| *G05D 23/19* | (2006.01) | |
| *G06F 3/0481* | (2013.01) | |
| *G06F 3/0484* | (2013.01) | |
| *F24F 11/52* | (2018.01) | |

(52) U.S. Cl.
CPC ...... *G06F 3/04817* (2013.01); *G06F 3/04842* (2013.01); *F24F 11/52* (2018.01); *F24F 2221/32* (2013.01)

(56) References Cited

U.S. PATENT DOCUMENTS

| | | |
|---|---|---|
| 4,223,831 A | 9/1980 | Szarka |
| 4,316,577 A | 2/1982 | Adams et al. |
| 4,335,847 A | 6/1982 | Levine |
| 4,460,125 A | 7/1984 | Barker et al. |
| 4,621,336 A | 11/1986 | Brown |
| 4,751,961 A | 6/1988 | Levine et al. |
| 4,768,706 A | 9/1988 | Parfitt |
| 4,847,781 A | 7/1989 | Brown, III et al. |
| 4,897,798 A | 1/1990 | Cler |
| 4,971,136 A | 11/1990 | Mathur et al. |
| 5,005,365 A | 4/1991 | Lynch |
| D321,903 S | 11/1991 | Chepaitis |
| 5,088,645 A | 2/1992 | Bell |
| 5,211,332 A | 5/1993 | Adams |
| 5,224,648 A | 7/1993 | Simon et al. |
| 5,224,649 A | 7/1993 | Brown et al. |
| 5,240,178 A | 8/1993 | Dewolf |
| 5,244,146 A | 9/1993 | Jefferson et al. |
| D341,848 S | 11/1993 | Bigelow et al. |
| 5,294,047 A | 3/1994 | Schwer et al. |
| 5,303,612 A | 4/1994 | Odom et al. |
| 5,395,042 A | 3/1995 | Riley et al. |
| 5,415,346 A | 5/1995 | Bishop |
| 5,460,327 A | 10/1995 | Hill et al. |
| 5,462,225 A | 10/1995 | Massara et al. |
| 5,476,221 A | 12/1995 | Seymour |
| 5,482,209 A | 1/1996 | Cochran et al. |
| 5,485,954 A | 1/1996 | Guy et al. |
| 5,499,196 A | 3/1996 | Pacheco |
| 5,544,036 A | 8/1996 | Brown, Jr. et al. |
| 5,555,927 A | 9/1996 | Shah |
| 5,603,451 A | 2/1997 | Helander et al. |
| 5,611,484 A | 3/1997 | Uhrich |
| 5,627,531 A | 5/1997 | Posso et al. |
| 5,673,850 A | 10/1997 | Uptegraph |
| 5,761,083 A | 6/1998 | Brown, Jr. et al. |
| D396,488 S | 7/1998 | Kunkler |
| 5,808,294 A | 9/1998 | Neumann |
| 5,808,602 A | 9/1998 | Sellers |
| 5,816,491 A | 10/1998 | Berkeley et al. |
| 5,902,183 A | 5/1999 | D'Souza |
| 5,909,378 A | 6/1999 | De Milleville |
| 5,918,474 A | 7/1999 | Khanpara et al. |
| 5,931,378 A | 8/1999 | Schramm |
| 5,959,621 A | 9/1999 | Nawaz et al. |
| 5,973,662 A | 10/1999 | Singers et al. |
| 5,977,964 A | 11/1999 | Williams et al. |
| 6,020,881 A | 2/2000 | Naughton et al. |
| 6,032,867 A | 3/2000 | Dushane et al. |
| 6,062,482 A | 5/2000 | Gauthier et al. |
| 6,066,843 A | 5/2000 | Scheremeta |
| D428,399 S | 7/2000 | Kahn et al. |
| 6,098,893 A | 8/2000 | Berglund et al. |
| 6,122,603 A | 9/2000 | Budike, Jr. |
| 6,164,374 A | 12/2000 | Rhodes et al. |
| 6,206,295 B1 | 3/2001 | LaCoste |
| 6,211,921 B1 | 4/2001 | Cherian et al. |
| 6,213,404 B1 | 4/2001 | Dushane et al. |
| 6,216,956 B1 | 4/2001 | Ehlers et al. |
| 6,286,764 B1 | 9/2001 | Garvey et al. |
| 6,298,285 B1 | 10/2001 | Addink et al. |
| 6,311,105 B1 | 10/2001 | Budike, Jr. |
| D450,059 S | 11/2001 | Itou |
| 6,349,883 B1 | 2/2002 | Simmons et al. |
| 6,351,693 B1 | 2/2002 | Monie et al. |
| 6,356,204 B1 | 3/2002 | Guindi et al. |
| 6,363,422 B1 | 3/2002 | Hunter et al. |
| 6,370,894 B1 | 4/2002 | Thompson |
| 6,415,205 B1 | 7/2002 | Myron et al. |
| 6,453,687 B2 | 9/2002 | Sharood et al. |
| D464,660 S | 10/2002 | Weng et al. |
| 6,478,233 B1 | 11/2002 | Shah |
| 6,502,758 B2 | 1/2003 | Cottrell |
| 6,513,723 B1 | 2/2003 | Mueller et al. |
| 6,519,509 B1 | 2/2003 | Nierlich et al. |
| D471,825 S | 3/2003 | Peabody |
| 6,595,430 B1 | 7/2003 | Shah |
| 6,619,055 B1 | 9/2003 | Addy |
| 6,622,925 B2 | 9/2003 | Carner et al. |
| D480,401 S | 10/2003 | Kahn et al. |
| 6,636,197 B1 | 10/2003 | Goldenberg et al. |
| 6,641,054 B2 | 11/2003 | Morey |
| 6,641,055 B1 | 11/2003 | Tiernan |
| 6,643,567 B2 | 11/2003 | Kolk et al. |
| 6,644,557 B1 | 11/2003 | Jacobs |
| 6,645,066 B2 | 11/2003 | Gutta et al. |
| D485,279 S | 1/2004 | DeCombe |
| 6,726,112 B1 | 4/2004 | Ho |
| D491,956 S | 6/2004 | Ombao et al. |
| 6,769,482 B2 | 8/2004 | Wagner et al. |
| 6,785,630 B2 | 8/2004 | Kolk et al. |
| 6,798,341 B1 | 9/2004 | Eckel et al. |
| D497,617 S | 10/2004 | Decombe et al. |
| 6,814,299 B1 | 11/2004 | Carey |
| 6,824,069 B2 | 11/2004 | Rosen |
| 6,851,621 B1 | 2/2005 | Wacker et al. |
| D503,631 S | 4/2005 | Peabody |
| 6,891,838 B1 | 5/2005 | Petite et al. |
| 6,904,385 B1 | 6/2005 | Budike, Jr. |
| 6,909,921 B1 | 6/2005 | Bilger |
| 6,951,306 B2 | 10/2005 | DeLuca |
| D511,527 S | 11/2005 | Hernandez et al. |
| 6,975,958 B2 | 12/2005 | Bohrer et al. |
| 6,990,821 B2 | 1/2006 | Singh et al. |
| 7,000,849 B2 | 2/2006 | Ashworth et al. |
| 7,024,336 B2 | 4/2006 | Salsbury et al. |
| 7,028,912 B1 | 4/2006 | Rosen |
| 7,038,667 B1 | 5/2006 | Vassallo et al. |
| 7,055,759 B2 | 6/2006 | Wacker et al. |
| 7,083,109 B2 | 8/2006 | Pouchak |
| 7,108,194 B1 | 9/2006 | Hankins, II |
| 7,111,788 B2 | 9/2006 | Reponen |
| 7,114,554 B2 | 10/2006 | Bergman et al. |
| 7,135,965 B2 | 11/2006 | Chapman, Jr. et al. |
| 7,140,551 B2 | 11/2006 | de Pauw et al. |
| 7,141,748 B2 | 11/2006 | Tanaka et al. |
| 7,142,948 B2 | 11/2006 | Metz |
| 7,149,727 B1 | 12/2006 | Nicholls et al. |
| 7,149,729 B2 | 12/2006 | Kaasten et al. |
| 7,152,806 B1 | 12/2006 | Rosen |
| 7,156,318 B1 | 1/2007 | Rosen |
| 7,159,789 B2 | 1/2007 | Schwendinger et al. |
| 7,159,790 B2 | 1/2007 | Schwendinger et al. |
| 7,181,317 B2 | 2/2007 | Amundson et al. |
| 7,188,482 B2 | 3/2007 | Sadegh et al. |
| 7,222,494 B2 | 5/2007 | Peterson et al. |
| 7,222,800 B2 | 5/2007 | Wruck |
| 7,225,054 B2 | 5/2007 | Amundson et al. |
| D544,877 S | 6/2007 | Sasser |
| 7,258,280 B2 | 8/2007 | Wolfson |
| D550,691 S | 9/2007 | Hally et al. |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,289,887 B2 | 10/2007 | Rodgers |

(56) References Cited

U.S. PATENT DOCUMENTS

| | | |
|---|---|---|
| 7,299,996 B2 | 11/2007 | Garrett et al. |
| 7,302,642 B2 | 11/2007 | Smith et al. |
| 7,333,880 B2 | 2/2008 | Brewster et al. |
| 7,346,467 B2 | 3/2008 | Bohrer et al. |
| D566,587 S | 4/2008 | Rosen |
| 7,379,791 B2 | 5/2008 | Tamarkin et al. |
| RE40,437 E | 7/2008 | Rosen |
| 7,418,663 B2 | 8/2008 | Pettinati et al. |
| 7,427,926 B2 | 9/2008 | Sinclair et al. |
| 7,434,742 B2 | 10/2008 | Mueller et al. |
| 7,451,937 B2 | 11/2008 | Flood et al. |
| 7,455,240 B2 | 11/2008 | Chapman, Jr. et al. |
| 7,460,690 B2 | 12/2008 | Cohen et al. |
| 7,469,550 B2 | 12/2008 | Chapman, Jr. et al. |
| D588,152 S | 3/2009 | Okada |
| 7,509,753 B2 | 3/2009 | Nicosia et al. |
| D589,792 S | 4/2009 | Clabough et al. |
| D590,412 S | 4/2009 | Saft et al. |
| 7,516,106 B2 | 4/2009 | Ehlers et al. |
| D593,120 S | 5/2009 | Bouchard et al. |
| 7,537,171 B2 | 5/2009 | Mueller et al. |
| D594,015 S | 6/2009 | Singh et al. |
| D595,309 S | 6/2009 | Sasaki et al. |
| 7,555,364 B2 | 6/2009 | Poth et al. |
| D596,194 S | 7/2009 | Vu et al. |
| D597,101 S | 7/2009 | Chaudhri et al. |
| 7,558,648 B2 | 7/2009 | Hoglund et al. |
| D598,463 S | 8/2009 | Hirsch et al. |
| 7,571,014 B1 | 8/2009 | Lambourne et al. |
| 7,571,865 B2 | 8/2009 | Nicodem et al. |
| 7,575,179 B2 | 8/2009 | Morrow et al. |
| D599,810 S | 9/2009 | Scalisi et al. |
| 7,584,899 B2 | 9/2009 | De Pauw et al. |
| 7,600,694 B2 | 10/2009 | Helt et al. |
| D603,277 S | 11/2009 | Clausen et al. |
| D603,421 S | 11/2009 | Ebeling et al. |
| D604,740 S | 11/2009 | Matheny et al. |
| 7,614,567 B2 | 11/2009 | Chapman, Jr. et al. |
| 7,620,996 B2 | 11/2009 | Torres et al. |
| D607,001 S | 12/2009 | Ording |
| 7,624,931 B2 | 12/2009 | Chapman, Jr. et al. |
| 7,634,504 B2 | 12/2009 | Amundson |
| 7,641,126 B2 | 1/2010 | Schultz et al. |
| 7,644,869 B2 | 1/2010 | Hoglund et al. |
| 7,667,163 B2 | 2/2010 | Ashworth et al. |
| D613,301 S | 4/2010 | Lee et al. |
| D614,194 S | 4/2010 | Guntaur et al. |
| D614,196 S | 4/2010 | Guntaur et al. |
| 7,693,582 B2 | 4/2010 | Bergman et al. |
| 7,702,424 B2 | 4/2010 | Cannon et al. |
| 7,703,694 B2 | 4/2010 | Mueller et al. |
| D614,976 S | 5/2010 | Skafdrup et al. |
| D615,546 S | 5/2010 | Lundy et al. |
| D616,460 S | 5/2010 | Pearson et al. |
| 7,721,209 B2 | 5/2010 | Tilton |
| 7,726,581 B2 | 6/2010 | Naujok et al. |
| D619,613 S | 7/2010 | Dunn |
| 7,784,704 B2 | 8/2010 | Harter |
| 7,802,618 B2 | 9/2010 | Simon et al. |
| D625,325 S | 10/2010 | Vu et al. |
| D625,734 S | 10/2010 | Kurozumi et al. |
| D626,133 S | 10/2010 | Murphy et al. |
| 7,823,076 B2 | 10/2010 | Borovsky et al. |
| RE41,922 E | 11/2010 | Gough et al. |
| 7,845,576 B2 | 12/2010 | Siddaramanna et al. |
| 7,848,900 B2 | 12/2010 | Steinberg et al. |
| 7,849,698 B2 | 12/2010 | Harrod et al. |
| 7,854,389 B2 | 12/2010 | Ahmed |
| D630,649 S | 1/2011 | Tokunaga et al. |
| 7,890,195 B2 | 2/2011 | Bergman et al. |
| 7,900,849 B2 | 3/2011 | Barton et al. |
| 7,904,209 B2 | 3/2011 | Podgorny et al. |
| 7,904,830 B2 | 3/2011 | Hoglund et al. |
| 7,908,116 B2 | 3/2011 | Steinberg et al. |
| 7,908,117 B2 | 3/2011 | Steinberg et al. |
| D638,835 S | 5/2011 | Akana et al. |
| D640,269 S | 6/2011 | Chen |
| D640,273 S | 6/2011 | Arnold et al. |
| D640,278 S | 6/2011 | Woo |
| D640,285 S | 6/2011 | Woo |
| D641,373 S | 7/2011 | Gardner et al. |
| 7,984,384 B2 | 7/2011 | Chaudhri et al. |
| D643,045 S | 8/2011 | Woo |
| 8,010,237 B2 | 8/2011 | Cheung et al. |
| 8,019,567 B2 | 9/2011 | Steinberg et al. |
| 8,037,022 B2 | 10/2011 | Rahman et al. |
| D648,735 S | 11/2011 | Arnold et al. |
| D651,529 S | 1/2012 | Mongell et al. |
| 8,090,477 B1 | 1/2012 | Steinberg |
| 8,091,375 B2 | 1/2012 | Crawford |
| 8,091,794 B2 | 1/2012 | Siddaramanna et al. |
| 8,131,207 B2 | 3/2012 | Hwang et al. |
| 8,131,497 B2 | 3/2012 | Steinberg et al. |
| 8,131,506 B2 | 3/2012 | Steinberg et al. |
| 8,136,052 B2 | 3/2012 | Shin et al. |
| D656,950 S | 4/2012 | Shallcross et al. |
| D656,952 S | 4/2012 | Weir et al. |
| 8,155,900 B1 | 4/2012 | Adams |
| 8,156,060 B2 | 4/2012 | Borzestowski et al. |
| 8,166,395 B2 | 4/2012 | Omi et al. |
| D658,674 S | 5/2012 | Shallcross et al. |
| 8,174,381 B2 | 5/2012 | Imes et al. |
| 8,180,492 B2 | 5/2012 | Steinberg |
| 8,185,164 B2 | 5/2012 | Kim |
| 8,195,313 B1 | 6/2012 | Fadell et al. |
| D663,743 S | 7/2012 | Tanghe et al. |
| D663,744 S | 7/2012 | Tanghe et al. |
| D664,559 S | 7/2012 | Ismail et al. |
| 8,219,249 B2 | 7/2012 | Harrod et al. |
| 8,223,134 B1 | 7/2012 | Forstall et al. |
| 8,234,581 B2 | 7/2012 | Kake |
| D664,978 S | 8/2012 | Tanghe et al. |
| D665,397 S | 8/2012 | Naranjo et al. |
| 8,243,017 B2 | 8/2012 | Brodersen et al. |
| 8,253,704 B2 | 8/2012 | Jang |
| 8,253,747 B2 | 8/2012 | Niles et al. |
| 8,280,536 B1 | 10/2012 | Fadell et al. |
| 8,281,244 B2 | 10/2012 | Neuman et al. |
| D671,136 S | 11/2012 | Barnett et al. |
| 8,316,022 B2 | 11/2012 | Matsuda et al. |
| D673,171 S | 12/2012 | Peters et al. |
| D673,172 S | 12/2012 | Peters et al. |
| 8,341,557 B2 | 12/2012 | Pisula et al. |
| 8,442,695 B2 | 5/2013 | Imes et al. |
| 8,442,752 B2 | 5/2013 | Wijaya et al. |
| 8,571,518 B2 | 10/2013 | Imes et al. |
| 8,893,032 B2 | 11/2014 | Bruck et al. |
| 2002/0005435 A1 | 1/2002 | Cottrell |
| 2002/0022991 A1 | 2/2002 | Sharood et al. |
| 2002/0178047 A1 | 11/2002 | Or et al. |
| 2003/0034898 A1 | 2/2003 | Shamoon et al. |
| 2003/0042320 A1 | 3/2003 | Decker |
| 2003/0070437 A1 | 4/2003 | Hafner et al. |
| 2003/0093186 A1 | 5/2003 | Patterson et al. |
| 2003/0112262 A1 | 6/2003 | Adatia et al. |
| 2003/0231001 A1 | 12/2003 | Bruning |
| 2004/0034484 A1 | 2/2004 | Solomita, Jr. et al. |
| 2004/0055446 A1 | 3/2004 | Robbin et al. |
| 2004/0074978 A1 | 4/2004 | Rosen |
| 2004/0095237 A1 | 5/2004 | Chen et al. |
| 2004/0133314 A1 | 7/2004 | Ehlers et al. |
| 2004/0164238 A1 | 8/2004 | Xu et al. |
| 2004/0225955 A1 | 11/2004 | Ly |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1 | 12/2004 | Hull |
| 2005/0043907 A1 | 2/2005 | Eckel et al. |
| 2005/0053063 A1 | 3/2005 | Madhavan |
| 2005/0055432 A1 | 3/2005 | Rodgers |
| 2005/0071780 A1 | 3/2005 | Muller et al. |
| 2005/0090915 A1 | 4/2005 | Geiwitz |
| 2005/0119766 A1 | 6/2005 | Amundson et al. |
| 2005/0119793 A1 | 6/2005 | Amundson et al. |

(56) References Cited

U.S. PATENT DOCUMENTS

| | | |
|---|---|---|
| 2005/0128067 A1 | 6/2005 | Zakrewski |
| 2005/0150968 A1 | 7/2005 | Shearer |
| 2005/0159847 A1 | 7/2005 | Shah et al. |
| 2005/0189429 A1 | 9/2005 | Breeden |
| 2005/0192915 A1 | 9/2005 | Ahmed et al. |
| 2005/0194456 A1 | 9/2005 | Tessier et al. |
| 2005/0195757 A1 | 9/2005 | Kidder et al. |
| 2005/0204997 A1 | 9/2005 | Fournier |
| 2005/0280421 A1 | 12/2005 | Yomoda et al. |
| 2006/0147003 A1 | 7/2006 | Archacki et al. |
| 2006/0186214 A1 | 8/2006 | Simon et al. |
| 2006/0196953 A1 | 9/2006 | Simon et al. |
| 2006/0206220 A1 | 9/2006 | Amundson |
| 2007/0001830 A1 | 1/2007 | Dagci et al. |
| 2007/0043478 A1 | 2/2007 | Ehlers et al. |
| 2007/0045430 A1 | 3/2007 | Chapman et al. |
| 2007/0045431 A1 | 3/2007 | Chapman, Jr. et al. |
| 2007/0045433 A1 | 3/2007 | Chapman et al. |
| 2007/0045444 A1 | 3/2007 | Gray et al. |
| 2007/0050732 A1 | 3/2007 | Chapman et al. |
| 2007/0057079 A1 | 3/2007 | Stark et al. |
| 2007/0084941 A1 | 4/2007 | De Pauw et al. |
| 2007/0105252 A1 | 5/2007 | Lee et al. |
| 2007/0114295 A1 | 5/2007 | Jenkins |
| 2007/0115902 A1 | 5/2007 | Shamoon et al. |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0185390 A1* | 8/2007 | Perkins ............... A61B 5/0002 600/300 |
| 2007/0205297 A1 | 9/2007 | Finkam et al. |
| 2007/0213876 A1 | 9/2007 | Warren et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0278320 A1 | 12/2007 | Lunacek et al. |
| 2008/0004838 A1 | 1/2008 | Yungkurth et al. |
| 2008/0006709 A1 | 1/2008 | Ashworth et al. |
| 2008/0015740 A1 | 1/2008 | Osann |
| 2008/0015742 A1 | 1/2008 | Kulyk et al. |
| 2008/0048046 A1 | 2/2008 | Wagner et al. |
| 2008/0054082 A1 | 3/2008 | Evans et al. |
| 2008/0054084 A1 | 3/2008 | Olson |
| 2008/0099568 A1 | 5/2008 | Nicodem et al. |
| 2008/0183335 A1 | 7/2008 | Poth et al. |
| 2008/0191045 A1 | 8/2008 | Harter |
| 2008/0215240 A1 | 9/2008 | Howard et al. |
| 2008/0221737 A1 | 9/2008 | Josephson et al. |
| 2008/0245480 A1 | 10/2008 | Knight et al. |
| 2008/0256475 A1 | 10/2008 | Amundson et al. |
| 2008/0262755 A1 | 10/2008 | Dayton et al. |
| 2008/0273754 A1 | 11/2008 | Hick et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0001181 A1 | 1/2009 | Siddaramanna et al. |
| 2009/0012959 A1 | 1/2009 | Ylivainio et al. |
| 2009/0057427 A1 | 3/2009 | Geadelmann et al. |
| 2009/0099699 A1 | 4/2009 | Steinberg et al. |
| 2009/0125151 A1 | 5/2009 | Steinberg et al. |
| 2009/0140056 A1 | 6/2009 | Leen |
| 2009/0140057 A1 | 6/2009 | Leen |
| 2009/0140060 A1 | 6/2009 | Stoner et al. |
| 2009/0140064 A1 | 6/2009 | Schultz et al. |
| 2009/0143916 A1* | 6/2009 | Boll .................... F24F 11/0086 700/276 |
| 2009/0143918 A1 | 6/2009 | Amundson et al. |
| 2009/0157529 A1 | 6/2009 | Ehlers et al. |
| 2009/0171862 A1 | 7/2009 | Harrod et al. |
| 2009/0194601 A1 | 8/2009 | Flohr |
| 2009/0195349 A1 | 8/2009 | Frader-Thompson et al. |
| 2009/0254225 A1 | 10/2009 | Boucher et al. |
| 2009/0259713 A1 | 10/2009 | Blumrich et al. |
| 2009/0261174 A1 | 10/2009 | Butler et al. |
| 2009/0263773 A1 | 10/2009 | Kotlyar et al. |
| 2009/0273610 A1 | 11/2009 | Busch et al. |
| 2009/0276714 A1 | 11/2009 | Kandlikar et al. |
| 2009/0283603 A1 | 11/2009 | Peterson et al. |
| 2009/0297901 A1 | 12/2009 | Kilian et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0050004 A1 | 2/2010 | Hamilton, II et al. |
| 2010/0058450 A1 | 3/2010 | Fein et al. |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070089 A1 | 3/2010 | Harrod et al. |
| 2010/0070093 A1 | 3/2010 | Harrod et al. |
| 2010/0070234 A1 | 3/2010 | Steinberg et al. |
| 2010/0070907 A1 | 3/2010 | Harrod et al. |
| 2010/0084482 A1 | 4/2010 | Kennedy et al. |
| 2010/0104074 A1 | 4/2010 | Yang |
| 2010/0106305 A1 | 4/2010 | Pavlak et al. |
| 2010/0106322 A1 | 4/2010 | Grohman |
| 2010/0107070 A1 | 4/2010 | Devineni et al. |
| 2010/0107076 A1 | 4/2010 | Grohman et al. |
| 2010/0107103 A1 | 4/2010 | Wallaert et al. |
| 2010/0163633 A1 | 7/2010 | Barrett et al. |
| 2010/0167783 A1 | 7/2010 | Alameh et al. |
| 2010/0168924 A1 | 7/2010 | Tessier et al. |
| 2010/0179704 A1 | 7/2010 | Ozog |
| 2010/0198425 A1 | 8/2010 | Donovan |
| 2010/0211224 A1 | 8/2010 | Keeling et al. |
| 2010/0261465 A1 | 10/2010 | Rhoads et al. |
| 2010/0262298 A1 | 10/2010 | Johnson et al. |
| 2010/0262299 A1 | 10/2010 | Cheung et al. |
| 2010/0273610 A1 | 10/2010 | Johnson |
| 2010/0276482 A1 | 11/2010 | Raihi et al. |
| 2010/0280667 A1 | 11/2010 | Steinberg |
| 2010/0282857 A1 | 11/2010 | Steinberg |
| 2010/0289643 A1* | 11/2010 | Trundle ............... F24F 11/0086 340/545.1 |
| 2010/0308119 A1 | 12/2010 | Steinberg et al. |
| 2010/0318227 A1 | 12/2010 | Steinberg et al. |
| 2011/0001812 A1 | 1/2011 | Kang et al. |
| 2011/0015797 A1 | 1/2011 | Gilstrap |
| 2011/0015798 A1 | 1/2011 | Golden et al. |
| 2011/0015802 A1 | 1/2011 | Imes |
| 2011/0022242 A1 | 1/2011 | Bukhin et al. |
| 2011/0029488 A1 | 2/2011 | Fuerst et al. |
| 2011/0046756 A1 | 2/2011 | Park |
| 2011/0046792 A1* | 2/2011 | Imes ...................... H04L 67/42 700/278 |
| 2011/0046805 A1 | 2/2011 | Bedros et al. |
| 2011/0046806 A1 | 2/2011 | Nagel et al. |
| 2011/0054710 A1 | 3/2011 | Imes et al. |
| 2011/0077758 A1 | 3/2011 | Tran et al. |
| 2011/0077896 A1 | 3/2011 | Steinberg et al. |
| 2011/0078675 A1 | 3/2011 | Van Camp et al. |
| 2011/0095897 A1 | 4/2011 | Sutrave |
| 2011/0106328 A1 | 5/2011 | Zhou et al. |
| 2011/0132990 A1 | 6/2011 | Lin et al. |
| 2011/0151837 A1 | 6/2011 | Winbush, III |
| 2011/0160913 A1 | 6/2011 | Parker et al. |
| 2011/0166828 A1 | 7/2011 | Steinberg et al. |
| 2011/0167369 A1 | 7/2011 | Van Os |
| 2011/0184563 A1 | 7/2011 | Foslien |
| 2011/0185895 A1 | 8/2011 | Freen |
| 2011/0257795 A1* | 10/2011 | Narayanamurthy .. F24F 5/0046 700/277 |
| 2011/0282937 A1 | 11/2011 | Deshpande et al. |
| 2011/0290893 A1 | 12/2011 | Steinberg |
| 2011/0307103 A1 | 12/2011 | Cheung et al. |
| 2011/0307112 A1 | 12/2011 | Barrilleaux |
| 2012/0005590 A1 | 1/2012 | Lombard et al. |
| 2012/0017611 A1 | 1/2012 | Coffel et al. |
| 2012/0036250 A1 | 2/2012 | Vaswani et al. |
| 2012/0046792 A1 | 2/2012 | Secor |
| 2012/0053745 A1 | 3/2012 | Ng |
| 2012/0065783 A1 | 3/2012 | Fadell et al. |
| 2012/0065935 A1 | 3/2012 | Steinberg et al. |

(56) References Cited

U.S. PATENT DOCUMENTS

| | | | |
|---|---|---|---|
| 2012/0068854 A1 | 3/2012 | Shiflet et al. |
| 2012/0085831 A1 | 4/2012 | Kopp |
| 2012/0086562 A1 | 4/2012 | Steinberg |
| 2012/0089523 A1 | 4/2012 | Hurri et al. |
| 2012/0101637 A1 | 4/2012 | Imes et al. |
| 2012/0116593 A1 | 5/2012 | Amundson et al. |
| 2012/0130513 A1 | 5/2012 | Hao et al. |
| 2012/0130546 A1 | 5/2012 | Matas et al. |
| 2012/0130907 A1 | 5/2012 | Thompson et al. |
| 2012/0131504 A1 | 5/2012 | Fadell et al. |
| 2012/0143536 A1 | 6/2012 | Greaves et al. |
| 2012/0158350 A1 | 6/2012 | Steinberg et al. |
| 2012/0166616 A1 | 6/2012 | Meehan et al. |
| 2012/0221151 A1 | 8/2012 | Steinberg |
| 2012/0252430 A1 | 10/2012 | Imes et al. |
| 2012/0274602 A1 | 11/2012 | Bita et al. |
| 2012/0296488 A1 | 11/2012 | Dharwada et al. |
| 2013/0014057 A1 | 1/2013 | Reinpoldt et al. |
| 2013/0055132 A1 | 2/2013 | Foslien |
| 2013/0090767 A1 | 4/2013 | Bruck et al. |
| 2013/0116953 A1 | 5/2013 | Pollard |
| 2013/0263034 A1 | 10/2013 | Bruck et al. |

FOREIGN PATENT DOCUMENTS

| | | |
|---|---|---|
| EP | 434926 | 7/1991 |
| EP | 1906069 | 12/1991 |
| EP | 720077 | 7/1996 |
| EP | 802471 | 10/1997 |
| EP | 1065079 | 1/2001 |
| EP | 1731984 | 12/2006 |
| EP | 2157492 | 2/2010 |
| EP | 2157492 A2 | 2/2010 |
| EP | 1703356 | 9/2011 |
| GB | 2212317 | 5/1992 |
| JP | 59106311 | 6/1984 |
| JP | 1252850 | 10/1989 |
| JP | 09298780 | 11/1997 |
| JP | 10023565 A | 1/1998 |
| JP | 2002087050 | 3/2002 |
| JP | 2003054290 | 2/2003 |
| NL | 1024986 | 6/2005 |
| WO | 0248851 | 6/2002 |
| WO | 2008054938 | 5/2008 |
| WO | 2009073496 | 6/2009 |
| WO | 2009073496 A2 | 6/2009 |
| WO | 2010033563 A1 | 3/2010 |
| WO | 2011128416 | 10/2011 |
| WO | 2011149600 A2 | 12/2011 |
| WO | 2012/024534 A2 | 2/2012 |
| WO | 2013058820 | 4/2013 |
| WO | 2013149210 | 10/2013 |

OTHER PUBLICATIONS

Notice of Allowance and Fee(s) Due dated Aug. 3, 2016, for U.S. Appl. No. 13/434,560, 8 pages.
Energy Joule, Ambient Devices, 2011, retrieved from the Internet: <URL: http://web.archive.org/web/20110723210421/http://www.ambientdevices.com/products/energyjoule.html> [retrieved on Aug. 1, 2012], Jul. 23, 2011, 2 pages.
Honeywell CT2700, An Electronic Round Programmable Thermostat—User's Guide, Honeywell, Inc., 1997, 8 pages.
Honeywell CT8775A,C, The digital Round Non-Programmable Thermostats—Owner's Guide, Honeywell International Inc., 2003, 20 pages.
Honeywell T8700C, An Electronic Round Programmable Thermostat—Owner's Guide, Honeywell, Inc., 1997, 12 pages.
Honeywell T8775 The Digital Round Thermostat, Honeywell, 2003, 2 pages.
Honeywell T8775AC Digital Round Thermostat Manual No. 69-1679EF-1, www.honeywell.com/yourhome, Jun. 2004, pp. 1-16.
ICY 3815TT-001 Timer-Thermostat Package Box, ICY BV Product Bar Code No. 8717953007902, 2009, 2 pages.
Introducing the New Smart Si Thermostat, Datasheet [online], retrieved from the Internet: <URL: https://www.ecobee.com/solutions/home/smart-si/> [retrieved on Feb. 25, 2013], Ecobee, Mar. 12, 2012, 4 pages.
The Clever Thermostat, ICY BV Web Page, http://www.icy.nl/en/consumer/products/clever-thermostat, ICY BV, 2012, 1 page.
The Clever Thermostat User Manual and Installation Guide, ICY BV ICY3815 Timer-Thermostat, 2009, pp. 1-36.
U.S. Appl. No. 60/512,886, Volkswagen Rotary Knob for Motor Vehicle—English Translation of German Application, filed Oct. 20, 2003.
Arens et al., Demand Response Electrical Appliance Manager—User Interface Design, Development and Testing, Poster, Demand Response Enabling Technology Development, University of California Berkeley, 2005, 1 page.
Arens et al., Demand Response Enabled Thermostat—Control Strategies and Interface, Demand Response Enabling Technology Development Poster, University of California Berkeley, 2004, 1 page.
Arens et al., Demand Response Enabling Technology Development, Phase I Report: Jun. 2003-Nov. 2005, University of California Berkeley, Apr. 4, 2006 pp. 1-108.
Arens et al., New Thermostat Demand Response Enabling Technology, Poster, University of California Berkeley, Jun. 10, 2004.
Auslander et al., UC Berkeley DR Research Energy Management Group, Power Point Presentation, DR ETD Workshop, State of California Energy Commission, Jun. 11, 2007, pp. 1-35.
Bourke, Server Load Balancing, O'Reilly & Associates, Inc., Aug. 2001, 182 pages.
Chatzigiannakis et al., Priority Based Adaptive Coordination of Wireless Sensors and Actors, Q2SWinet '06, Oct. 2006, pp. 37-44.
Chen et al., Demand Response-Enabled Residential Thermostat Controls, Abstract, ACEEE Summer Study on Energy Efficiency in Buildings, Mechanical Engineering Dept. and Architecture Dept., University of California Berkeley, 2008, pp. 1-24 through 1-36.
Detroitborg, Nest Learning Thermostat: Unboxing and Review, [online], retrieved from the Internet: <URL: http://www.youtube.com/watch?v=KrgcOL4oLzc> [retrieved on Aug. 22, 2013], Feb. 10, 2012, 4 pages.
GREEN, Thermo Heat Tech Cool, Popular Mechanics Electronic Thermostat Guide, Oct. 1985, pp. 155-158.
Meier et al., Thermostat Interface Usability: A Survey, Ernest Orlando Lawrence Berkeley National Laboratory, Environmental Energy Technologies Division, Berkeley California, Sep. 2010, pp. 1-73.
Peffer et al., A Tale of Two Houses: The Human Dimension of Demand Response Enabling Technology from a Case Study of Adaptive Wireless Thermostat, Abstract, ACEEE Summer Study on Energy Efficiency in Buildings, Architecture Dept. and Mechanical Engineering Dept., University of California Berkeley, 2008, pp. 7-242 through 7-253.
Peffer et al., Smart Comfort At Home: Design of a Residential Thermostat to Achieve Thermal Comfort, and Save Money and Peak Energy, University of California Berkeley, Mar. 2007, 1 page.
Salus, S-Series Digital Thermostat Instruction Manual-ST620 Model No. Instruction Manual, www.salus-tech.com, Version 005, Apr. 29, 2010, 24 pages.
Sanford, iPod (Click Wheel) (2004), www.apple-history.com, retrieved from the Internet: <URL: http://apple-history.com/ipod> [retrieved on Apr. 9, 2012], 2012, 2 pages.
White et al., A Conceptual Model for Simulation Load Balancing, Proceedings of the 1998 Spring Simulation Interoperability Workshop, 1998, pp. 1-7.
Wright et al., DR ETD—Summary of New Thermostat, TempNode, & New Meter (UC Berkeley Project), Power Point Presentation, Public Interest Energy Research, University of California Berkeley, 2005, pp. 1-49.
International Application No. PCT/US2013/034718, International Search Report and Written Opinion dated Sep. 6, 2013, all pages.
Hai Lin, et al., Internet Based Monitoring and controls for Hvac applications, Jan. 2002, IEEE, p. 49-54.

(56) References Cited

OTHER PUBLICATIONS

Non-Final Office Action dated Oct. 20, 2014 for U.S. Appl. No. 13/434,560, filed Apr. 29, 2012, all pages.
Final Office Action dated Apr. 7, 2015 for U.S. Appl. No. 13/434,560, filed Apr. 29, 2012, all pages.
Non-Final Office Action dated Dec. 26, 2012 for U.S. Appl. No. 13/624,875, filed Sep. 21, 2012, all pages.
Final Office Action dated Aug. 30, 2013 for U.S. Appl. No. 13/624,875, filed Sep. 21, 2012, all pages.
Notice of Allowance dated Jul. 18, 2014 for U.S. Appl. No. 13/624,875, filed Sep. 21, 2012, all pages.
SCE Energy$mart Thermostat Study for Southern California Edison—Presentation of Study Results, Population Research Systems, Project #1010, Nov. 10, 2004, 51 pages.
De Almeida, et al., Advanced Monitoring Technologies for the Evaluation of Demand-Side Management Programs, Energy, Vo.. 19, No. 6, 1994, pp. 661-678.
Gevorkian, Alternative Energy Systems in Building Design, 2009, pp. 195-200.
Hoffman, et al., Integration of Remote Meter Reading, Load Control and Monitoring of Customers' Installations for Customer Automation with Telephone Line Signaling, Electricity Distribution, 1989, CIRED 1989. 10th International Conference on May 8-12, 1989. pp. 421-424.
Levy, A Vision of Demand Response—2016, The Electricity Journal, vol. 19, Issue 8, Oct. 2006, pp. 12-23.
LOPES, Case Studies in Advanced Thermostat Control for Demand Response, AEIC Load Research Conference, St. Louis, MO, Jul. 2004, 36 pages.
Martinez, SCE Energy$mart Thermostat Program, Advanced Load Control Alliance, Oct. 5, 2004, 20 pages.
MATTY, Advanced Energy Management for Home Use, IEEE Transaction on Consumer electronics, vol. 35, No. 3, Aug. 1989, pp. 584-588.
Motegi, et al., Introduction to Commercial Building Control Strategies and Techniques for Demand Response, Demand Response Research Center, May 22, 2007, 35 pages.
First Office Action dated Sep. 25, 2015, for Chinese Patent Application No. 201380029046.X, filed Mar. 29, 2013, 8 pages (with English Translation.).
International Search Report and Written Opinion dated Jul. 6, 2012, for International Patent Application No. PCT/US2012/030084 filed Mar. 22, 2012, all pages.
International Preliminary Report on Patentability dated Apr. 22, 2014, for International Patent Application No. PCT/US2012/030084, filed Mar. 22, 2012, all pages.
Aprilaire Electronic Thermostats Model 8355 User's Manual, Research Products Corporation, Dec. 2000, 16 pages.
Braeburn 5300 Installer Guide, Braeburn Systems, LLC, Dec. 9, 2009, 10 pages.
Braeburn Model 5200 Braeburn Systems, LLC, Jul. 20, 2011, 11 pages.
Ecobee Smart Si Thermostat Installation Manual, Ecobee, Apr. 3, 2012, 40 pages.
Ecobee Smart Si Thermostat User Manual, Ecobee, Apr. 3, 2012, 44 pages.
Ecobee Smart thermostat Installation Manual, Jun. 29, 2011, 20 pages.
Ecobee Smart Thermostat User Manual, May 11, 2010, 20 pages.
Electric Heat Lock Out on Heat Pumps, Washington State University Extension Energy Program, Apr. 2010, pp. 1-3.
Honeywell Installation Guide FocusPRO TH6000 Series, Honeywell International, Inc., Jan. 5, 2012, 24 pages.
Honeywell Operating Manual FocusPRO TH6000 Series, Honeywell International, Inc., Mar. 25, 2011, 80 pages.
Honeywell Prestige THX9321-9421 Operating Manual, Honeywell International, Inc., Jul. 6, 2011, 120 pages.
Honeywell THX9321 Prestige 2.0 and TXH9421 Prestige IAQ 2.0 with EIM Product Data, Honeywell International, Inc., 68-0311, Jan. 2012, 126 pages.
Hunter Internet Thermostat Installation Guide, Hunter Fan Co., Aug. 14, 2012, 8 pages.
Lennox ComfortSense 5000 Owners guide, Lennox Industries, Inc., Feb. 2008, 32 pages.
Lennox ComfortSense 7000 Owners Guide, Lennox Industries, Inc., May 2009, 15 pages.
Lennox iComfort Manual, Lennox Industries, Inc., Dec. 2010, 20 pages.
Lux PSPU732T Manual, LUX Products Corporation, Jan. 6, 2009, 48 pages.
NetX RP32-WIFI Network Thermostat consumer Brochure, Network Thermostat, May 2011, 2 pages.
NetX RP32-WIFI Network Thermostat Specification Sheet, Network Thermostat, Feb. 28, 2012, 2 pages.
RobertShaw Product Manual 9620, Maple Chase Company, Jun. 12, 2001, 14 pages.
RobertShaw Product Manual 9825i2, Maple Chase Company, Jul. 17, 2006, 36 pages.
SYSTXCCUIZ01-V Infinity Control Installation Instructions, Carrier Corp., May 31, 2012, 20 pages.
T8611G Chronotherm IV Deluxe Programmable Heat Pump Thermostat Product Data, Honeywell International, Inc., Oct. 1997, 24 pages.
TB-PAC, PB-PHP, Base Series Programmable Thermostats, Carrier Corp., May 14, 2012, 8 pages.
The Perfect Climate Comfort Center PC8900A W8900A-C Product Data Sheet, Honeywell International Inc., Apr. 2001, 44 pages.
TP-PAC, TP-PHP, TP-NAC, TP-NHP Performance Series AC/HP Thermostat Installation Instructions, Carrier corp., Sep. 2007, 56 pages.
Trane Communicating Thermostats for Fan Coil, Trane, May 2011, 32 pages.
Trane Communicating thermostats for Heat Pump Control, Trane, May 2011, 32 pages.
Trane Install XL600 Installation Manual, Trane, Mar. 2006, 16 pages.
Trane XL950 Installation Guide, Trane, Mar. 2011, 20 pages.
Venstar T2900 Manual, Venstar, Inc., Apr. 2008, 113 pages.
Venstar T5800 Manual, Venstar, Inc., Sep. 7, 2011, 63 pages.
VisionPRO TH8000 Series Installation Guide, Honeywell International, Inc., Jan. 2012, 12 pages.
VisionPRO TH8000 Series Operating Manual, Honeywell International, Inc., Mar. 2011, 96 pages.
VisionPRO Wi-Fi Programmable Thermostat User Guide, Honeywell International, Inc., Aug. 2012, 48 pages.
White Rodgers (Emerson) Model 1F81-261 Installation and Operating Instructions, White Rodgers Apr. 15, 2010, 8 pages.
White Rodgers (Emerson) Model IF98EZ-1621 Homeowner's User Guide, White Rodgers, Jan. 25, 2012, 28 pages.
Akhlaghinia, et al., Occupancy Monitoring in Intelligent Environment through Integrated Wireless Localizing Agents, IEEE, 2009, 7 pages.
Akhlaghinia, et al., Occupant Behavior Prediction in Ambient Intelligence Computing Environment, Journal of Uncertain Systems, vol. 2, No. 2, 2008, pp. 85-100.
Allen, et al., Real-Time Earthquake Detection and Hazard Assessment by ElarmS Across California, Geophysical Research Letters, vol. 36, L00B08, 2009, pp. 1-6.
DELEEUW, Ecobee WiFi Enabled Smart Thermostat Part 2: The Features Review, retrieved from <URL:http://www.homenetworkenabled.com/content.php?136-ecobee-WiFi-enabled-Smart-Thermostat-Part-2-The-Features-review> [retrieved on Jan. 8, 2013], Dec. 2, 2011, 5 pages.
Gao, et al., The Self-Programming Thermostat: Optimizing Setback Schedules Based on Home Occupancy Patterns, In Proceedings of the First ACM Workshop on Embedded Sensing Systems for Energy-Efficiency in Buildings, Nov. 3, 2009, 6 pages.
Loisos, et al., Buildings End-Use Energy Efficiency: Alternatives to Compressor Cooling, California Energy Commission, Public Interest Energy Research, Jan. 2000, 80 pages.

(56) References Cited

OTHER PUBLICATIONS

Lu, et al., The Smart Thermostat: Using Occupancy Sensors to Save Energy in Homes, In Proceedings of the 8th ACM Conference on Embedded Networked Sensor Systems, Nov. 3-5, 2010, pp. 211-224.
Mozer, The Neural Network House: An Environmental that Adapts to its Inhabitants, Proceedings of the American Association for Artificial Intelligence SS-98-02-, 1998, pp. 110-114.
Ros, et al., Multi-Sensor Human Tracking with the Bayesian Occupancy Filter, IEEE, 2009, 8 pages.
Wong, et al,. Maximum Likelihood Estimation of ARMA Model with Error Processes for Replicated Observations, National University of Singapore, Department of Economics, Working Paper No. 0217, Feb. 2002, pp. 1-19.
U.S. Appl. No. 15/258,422, filed Sep 7, 2016, Notice of Allowance dated Apr. 11, 2017, all pages.

\* cited by examiner

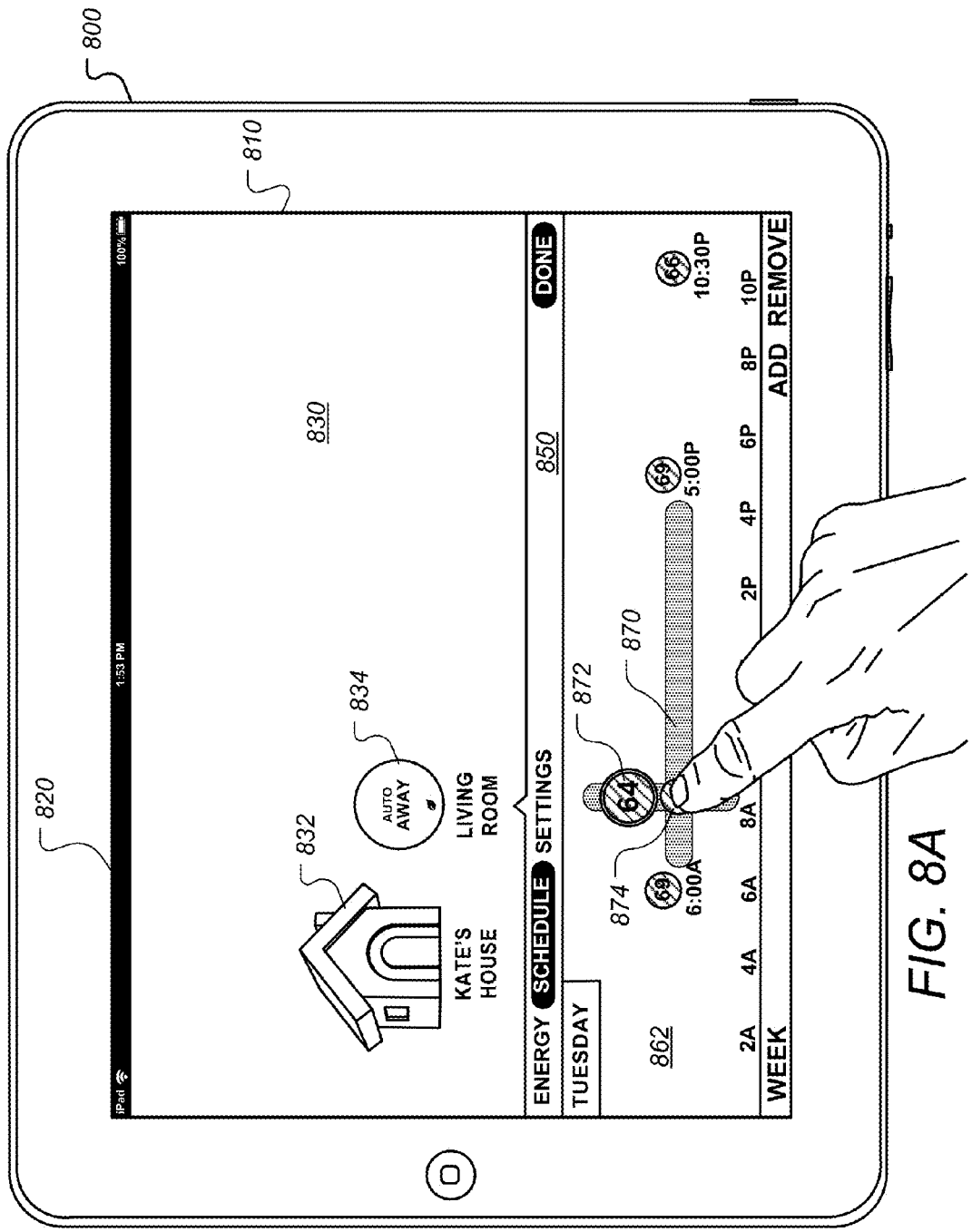

USER INTERFACES FOR HVAC SCHEDULE DISPLAY AND MODIFICATION ON SMARTPHONE OR OTHER SPACE-LIMITED TOUCHSCREEN DEVICE This application is a continuation of U.S. Ser. No. 13/624,875, filed Sep. 21, 2012, which is a continuation-in-part of U.S. Ser. No. 13/434,560 filed Mar. 29, 2012. Each of the above-referenced patent applications is incorporated by reference herein.

FIELD

This patent specification relates to systems, methods, and related computer program products for the monitoring and control of energy-consuming systems or other resource-consuming systems. More particularly, this patent specification relates to user interfaces for HVAC schedule display and modification on smartphone or other space-limited touchscreen device.

BACKGROUND

Particular challenges arise when designing a remote user-interface for a programmable thermostat where the remote user device is a smart phone or other space-limited touch screen device. On such space limited devices it can be difficult or confusing for a user to make simple programming changes such as adding, editing or deleting setpoints, as well as obtain information with would be useful in maintaining both comfort in the user's dwelling and energy efficiency of the HVAC system.

It is to be appreciated that although exemplary embodiments are presented herein for the particular context of HVAC system control, there are a wide variety of other resource usage contexts for which the embodiments are readily applicable including, but not limited to, water usage, air usage, the usage of other natural resources, and the usage of other (i.e., non-HVAC-related) forms of energy, as would be apparent to the skilled artisan in view of the present disclosure. Therefore, such application of the embodiments in such other resource usage contexts is not outside the scope of the present teachings.

SUMMARY

According to one or more embodiments, a method is described of interactively and graphically interfacing with a user of an HVAC system controlled by a thermostat. The method includes: storing a plurality of programmed setpoints on a memory on the thermostat, each of the setpoints being associated with a setpoint temperature and a time at which the setpoint is programmed to become active; on a small format touch-screen display device in a location remote from the thermostat (for example on a smart phone or a table computer), graphically displaying a two dimensional plot including one or more setpoint icons each being associated with one of the plurality of programmed setpoints, such that the position of each setpoint icon indicates to the user the temperature by virtue of a position of the icon along a first axis and the time by virtue of a position of the icon along a second axis associated with the associated setpoint; receiving user input in a form of a touch motion (for example a dragging motion) by the user of a displayed setpoint icon indicating an intention by the user to adjust (1) the temperature of the setpoint associated with the icon by virtue of the touch motion being primarily in a direction parallel to the first axis, or (2) the time of the setpoint associated with the icon by virtue of the touch motion being primarily in the direction of the second axis; and constraining user adjustments to time adjustments when the received user input indicates an intention to adjust the time, and constraining user adjustments to temperature adjustments when the received user input indicates an intention to adjust the temperature.

According to some embodiments indicators (such as shaded bars) are displayed indicating that the setpoint can be adjusted both in directions initially (parallel to both the first and second axes), and after the constraining, displaying only indicators associated with the un-constrained axis. According to some embodiments, a large setpoint icon can be displayed above the setpoint icon.

According to some embodiments, a method is described of interactively and graphically displaying programmed setpoint information to a user of an HVAC system controlled by a thermostat. The method includes: receiving and storing information indicating for a first thermostat setpoint, a way in which the first setpoint was generated and/or adjusted, the indicated way being selected from one of a plurality of predefined ways in which setpoints can be generated and/or adjusted; on a display device in a location remote from the thermostat, graphically displaying a graphical daily summary of thermostat information for each of a plurality of days, the graphical daily summary including at least a first setpoint icon representing the first setpoint; and in response to a user selecting of a displayed first setpoint icon, displaying information indicating to the user the way in which the first setpoint was generated and/or adjusted. According to some embodiments the plurality of predefined ways includes one or more of the following: by a user on the thermostat, by a user using a mobile device, by a user using a web application, and by an automated learning algorithm. When the setpoint was generated and/or adjusted by a mobile device, the displayed information preferably indicates an identification of a name associated with a mobile device.

It will be appreciated that these systems and methods are novel, as are applications thereof and many of the components, systems, methods and algorithms employed and included therein. It should be appreciated that embodiments of the presently described inventive body of work can be implemented in numerous ways, including as processes, apparata, systems, devices, methods, computer readable media, computational algorithms, embedded or distributed software and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIGS. 8A-8B show aspects of a thermostat graphical user interface implemented on a tablet computer with a touch screen device, according to some embodiments.

DETAILED DESCRIPTION

Figure 1:
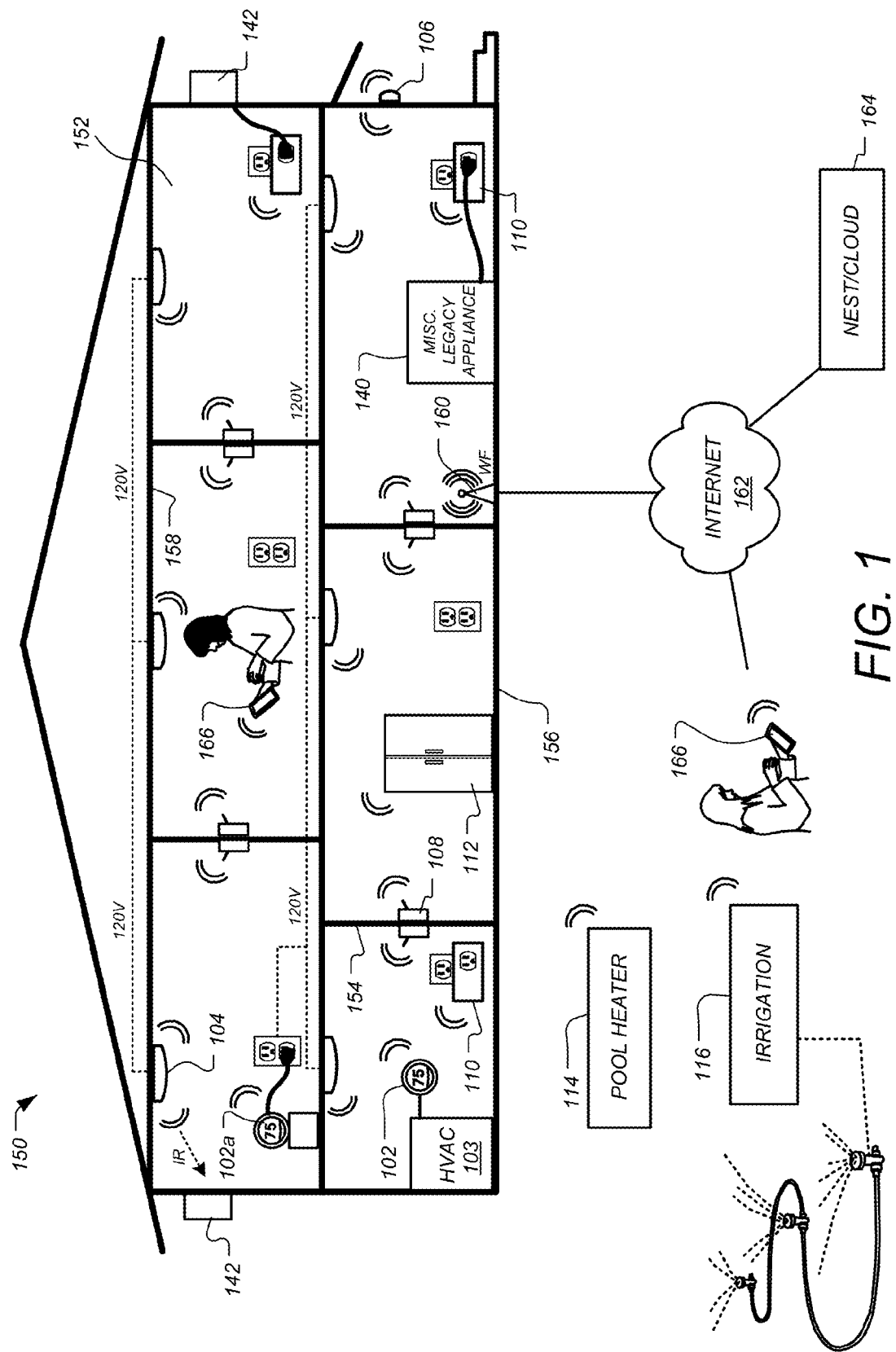
FIG. 1 illustrates an example of a smart home environment within which one or more of the devices, methods, systems, services, and/or computer program products described further herein can be applicable.

The subject matter of this patent specification relates to the subject matter of the following commonly assigned applications, each of which is incorporated by reference herein: U.S. Ser. No. 13/269,501 filed Oct. 7, 2011; and U.S. Ser. No. 13/317,423 filed Oct. 17, 2011. The above-referenced patent applications are collectively referenced herein as "the commonly assigned incorporated applications."

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
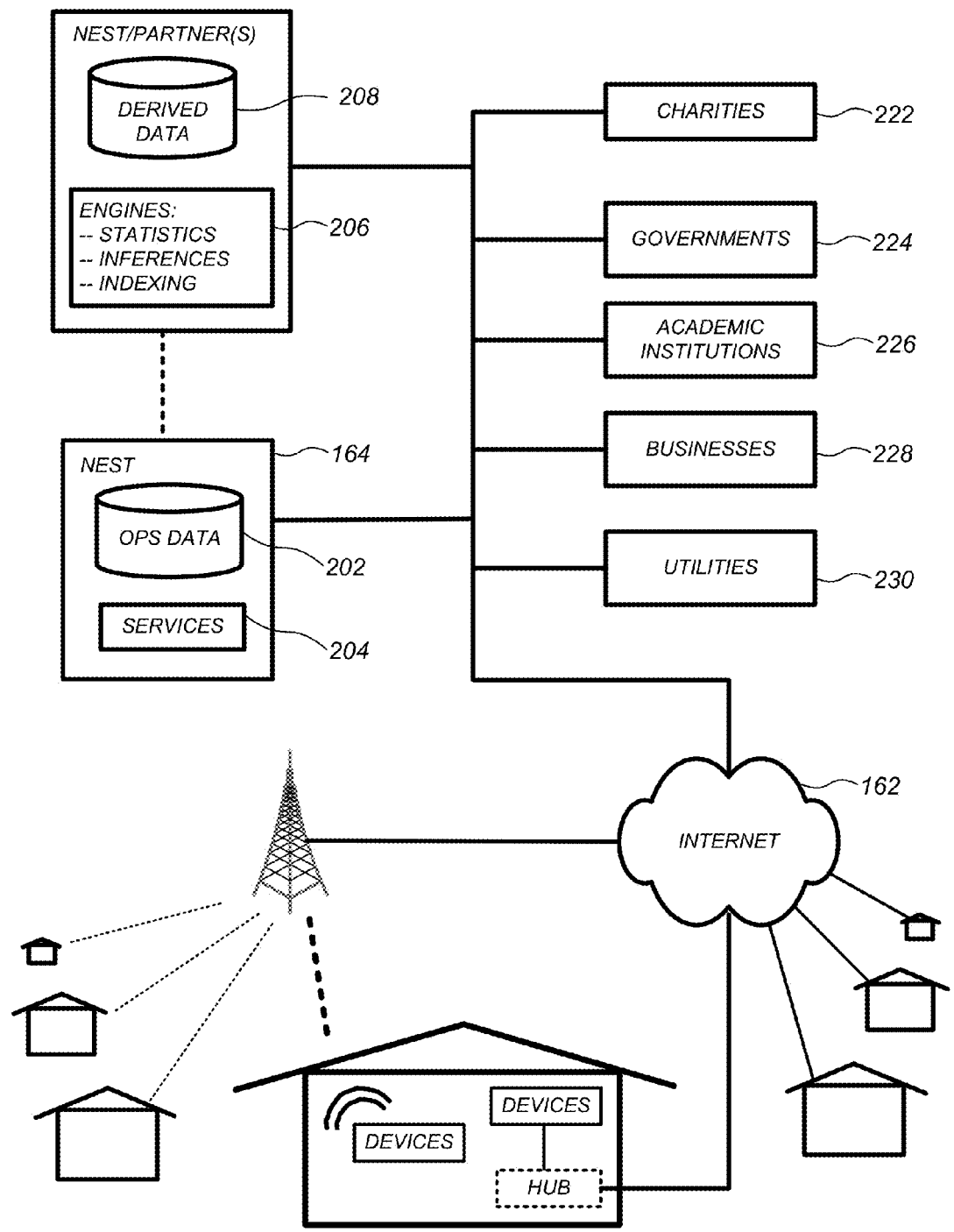
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
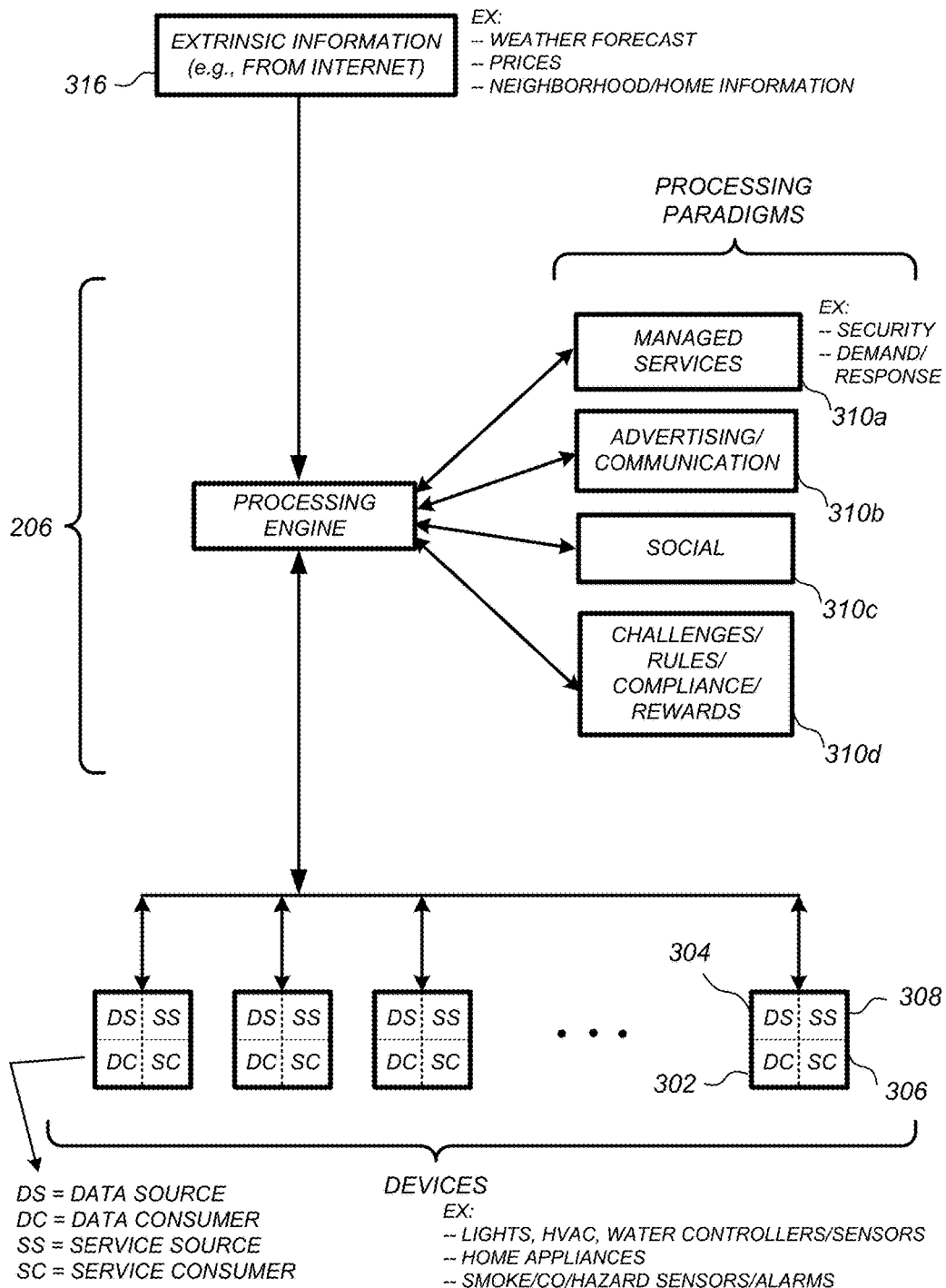
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310*a* that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310*b* that estimates characteristics (e.g., demographic information), desires and/or products of interest of a user based on device usage. Services, promotions, products or upgrades can then be offered or automatically provided to the user. Processing engine 206 can further include a social paradigm 310*c* that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310*d* that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4:
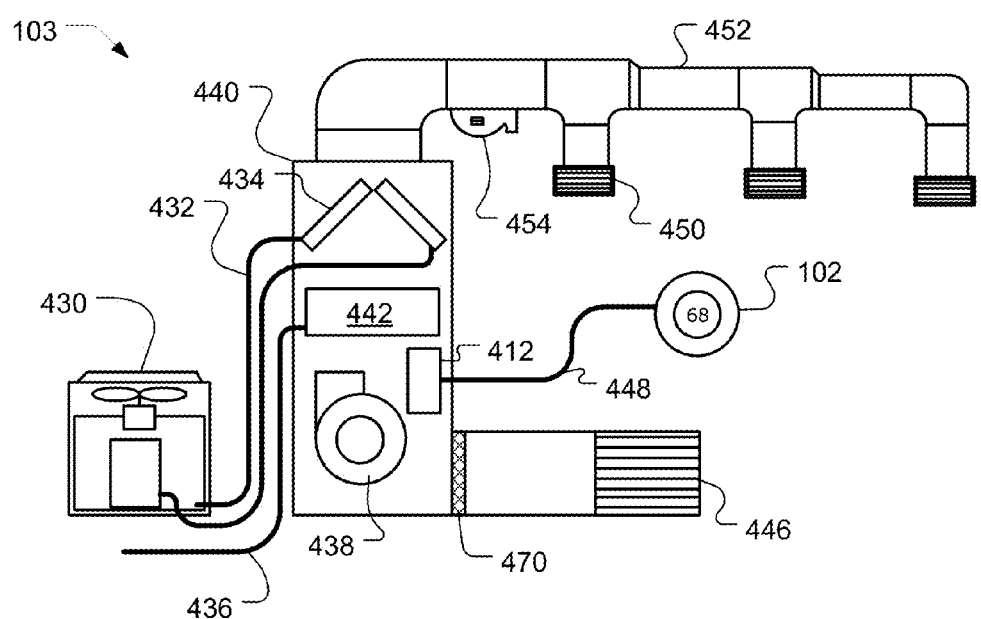
FIG. 4 is a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a gas such as Freon through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

Figure 5A:
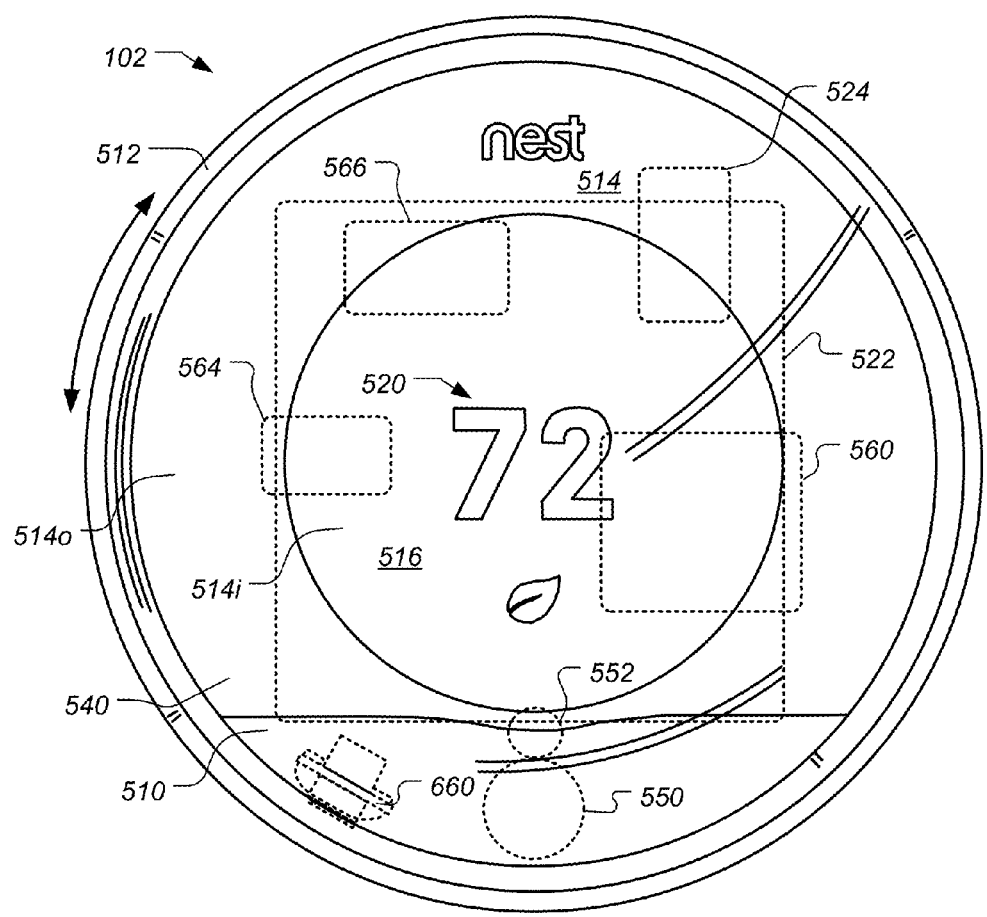
FIGS. 5A-5D illustrate a thermostat having a visually pleasing, smooth, sleek and rounded exterior appearance while at the same time including one or more sensors for detecting occupancy and/or users, according to some embodiments.
Figure 5B:
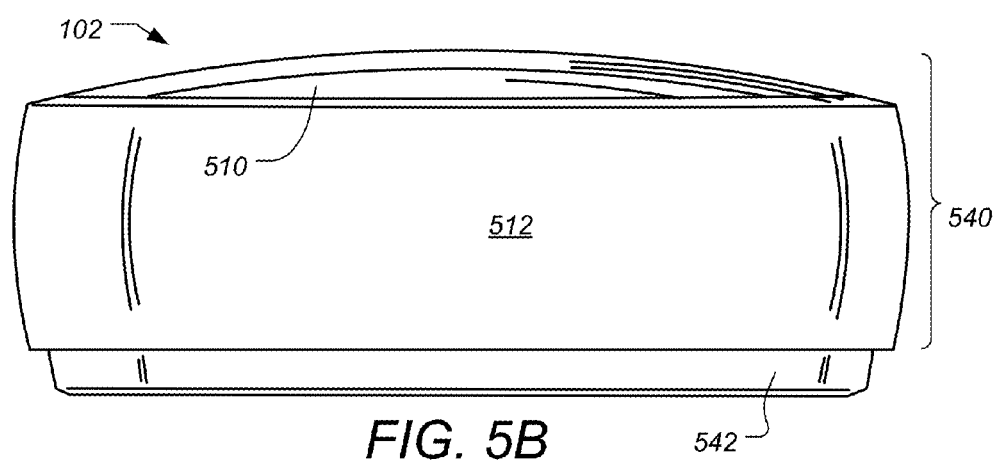
Figure 5C:
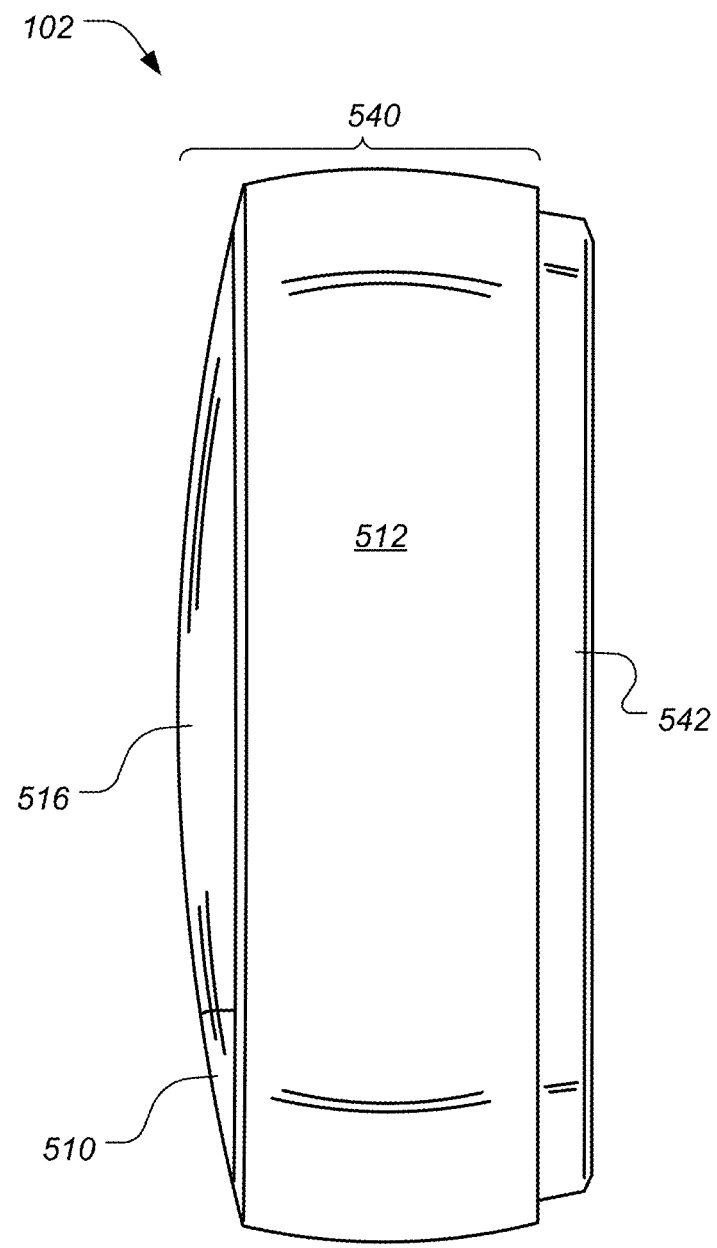
Figure 5D:
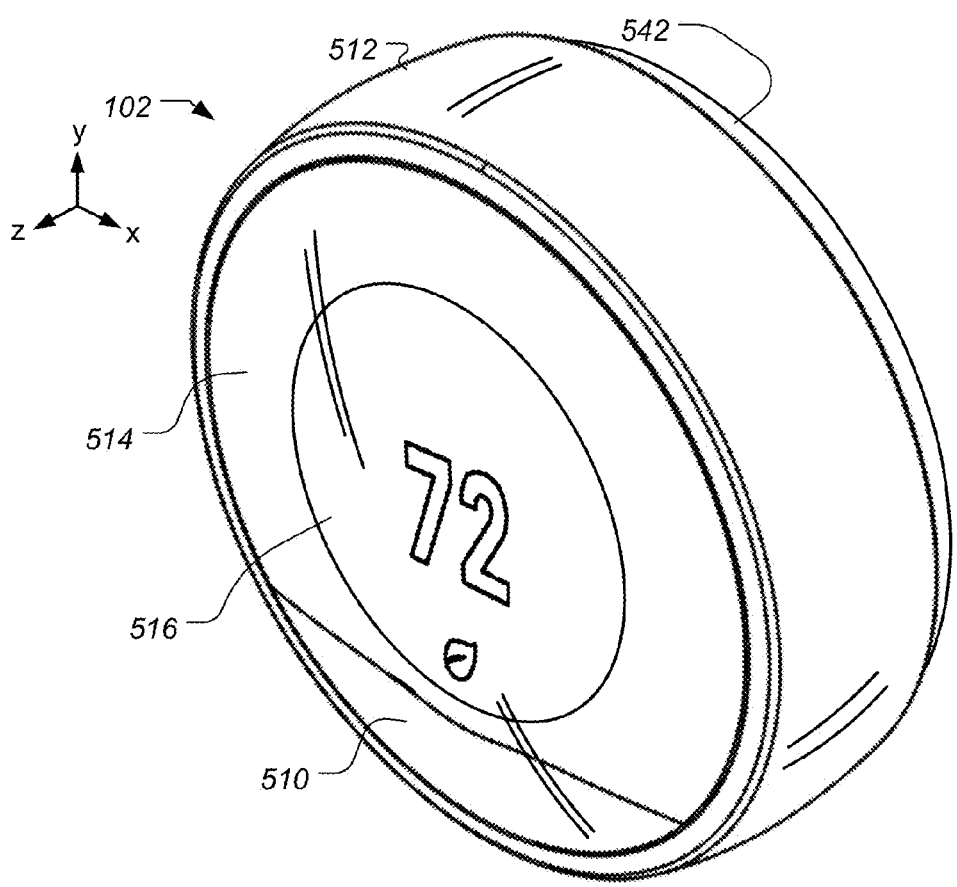

FIGS. 5A-5D illustrate a thermostat having a visually pleasing, smooth, sleek and rounded exterior appearance while at the same time including one or more sensors for detecting occupancy and/or users, according to some embodiments. FIG. 5A is front view, FIG. 5B is a bottom elevation, FIG. 5C is a right side elevation, and FIG. 5D is prospective view of thermostat 102. Unlike many prior art thermostats, thermostat 102 has a sleek, simple, uncluttered and elegant design that does not detract from home decoration, and indeed can serve as a visually pleasing centerpiece for the immediate location in which it is installed. Moreover, user interaction with thermostat 102 is facilitated and greatly enhanced over known conventional thermostats by the design of thermostat 102. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 is circular in shape in that it appears as a generally disk-like circular object when mounted on the wall. Thermostat 102 has a large convex rounded front face lying inside the outer ring 512. According to some embodiments, thermostat 102 is approximately 80 mm in diameter and protrudes from the wall, when wall mounted, by 32 mm. The outer rotatable ring 512 allows the user to make adjustments, such as selecting a new setpoint temperature. For example, by rotating the outer ring 512 clockwise, the realtime (i.e. currently active) setpoint temperature can be increased, and by rotating the outer ring 512 counterclockwise, the realtime setpoint temperature can be decreased. The front face of the thermostat 102 comprises a clear cover 514 that according to some embodiments is polycarbonate, and a Fresnel lens 510 having an outer shape that matches the contours of the curved outer front face of the thermostat 102. According to some embodiments, the Fresnel lens elements are formed on the interior surface of the Fresnel lens piece 510 such that they are not obviously visible by viewing the exterior of the thermostat 102. Behind the Fresnel lens is a passive infrared sensor 550 for detecting occupancy, and the Fresnel lens piece 510 is made from a high-density polyethylene (HDPE) that has an infrared transmission range appropriate for sensitivity to human bodies. As shown in FIGS. 5A-5D, the front edge of rotating ring 512, front face 514 and Fresnel lens 510 are shaped such that they together form a, integrated convex rounded front face that has a common outward arc or spherical shape gently arcing outward.

Although being formed from a single lens-like piece of material such as polycarbonate, the cover 514 has two different regions or portions including an outer portion 514o and a central portion 514i. According to some embodiments, the cover 514 is painted or smoked around the outer portion 514o, but leaves the central portion 514i visibly clear so as to facilitate viewing of an electronic display 516 disposed thereunderneath. According to some embodiments, the curved cover 514 acts as a lens that tends to magnify the information being displayed in electronic display 516 to users. According to some embodiments the central electronic display 516 is a dot-matrix layout (i.e. individually addressable) such that arbitrary shapes can be generated, rather than being a segmented layout. According to some embodiments, a combination of dot-matrix layout and segmented layout is employed. According to some embodiments, central display 516 is a backlit color liquid crystal display (LCD). An example of information displayed on the electronic display 516 is illustrated in FIG. 5A, and includes central numerals 520 that are representative of a current setpoint temperature. The thermostat 102 is preferably constructed such that the electronic display 516 is at a fixed orientation and does not rotate with the outer ring 512, so that the electronic display 516 remains easily read by the user. For some embodiments, the cover 514 and Fresnel lens 510 also remain at a fixed orientation and do not rotate with the outer ring 512. According to one embodiment in which the diameter of the thermostat 102 is about 80 mm, the diameter of the electronic display 516 is about 45 mm. According to some embodiments the gently outwardly curved shape of the front surface of thermostat 102, which is made up of cover 514, Fresnel lens 510 and the front facing portion of ring 512, is spherical, and matches a sphere having a radius of between 100 mm and 150 mm. According to some embodiments, the radius of the spherical shape of the thermostat front is about 136 mm.

Motion sensing with PIR sensor 550 as well as other techniques can be used in the detection and/or predict of occupancy, as is described further in the commonly assigned U.S. Ser. No. 12/881,430, which is incorporated herein by reference. According to some embodiments, occupancy information is used in generating an effective and efficient scheduled program. A second downwardly-tilted PIR sensor 552 is provided to detect an approaching user. The proximity sensor 552 can be used to detect proximity in the range of about one meter so that the thermostat 102 can initiate "waking up" when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, for the combined purposes of inspiring user confidence and further promoting visual and functional elegance, the thermostat 102 is controlled by only two types of user input, the first being a rotation of the outer ring 512 as shown in FIG. 5A (referenced hereafter as a "rotate ring" or "ring rotation" input), and the second being an inward push on head unit 540 until an audible and/or tactile "click" occurs (referenced hereafter as an "inward click" or simply "click" input). For such embodiments, the head unit 540 is an assembly that includes all of the outer ring 512, cover 514, electronic display 516, and the Fresnel lens 510. When pressed inwardly by the user, the head unit 540 travels inwardly by a small amount, such as 0.5 mm, against an interior metallic dome switch (not shown), and then springably travels back outwardly by that same amount when the inward pressure is released, providing a satisfying tactile "click" sensation to the user's hand, along with a corresponding gentle audible clicking sound.

Thus, for the embodiment of FIGS. 5A-5D, an inward click can be achieved by direct pressing on the outer ring 512 itself, or by indirect pressing of the outer ring by virtue of providing inward pressure on the cover 514, lens 510, or by various combinations thereof. For other embodiments, the thermostat 102 can be mechanically configured such that only the outer ring 512 travels inwardly for the inward click input, while the cover 514 and lens 510 remain motionless. It is to be appreciated that a variety of different selections and combinations of the particular mechanical elements that will travel inwardly to achieve the "inward click" input are within the scope of the present teachings, whether it be the outer ring 512 itself, some part of the cover 514, or some combination thereof. However, it has been found particularly advantageous to provide the user with an ability to quickly go back and forth between registering "ring rotations" and "inward clicks" with a single hand and with minimal amount of time and effort involved, and so the ability to provide an inward click directly by pressing the outer ring 512 has been found particularly advantageous, since the user's fingers do not need to be lifted out of contact with the device, or slid along its surface, in order to go between ring rotations and inward clicks. Moreover, by virtue of the strategic placement of the electronic display 516 centrally inside the rotatable ring 512, a further advantage is provided in that the user can naturally focus their attention on the electronic display throughout the input process, right in the middle of where their hand is performing its functions. The combination of intuitive outer ring rotation, especially as applied to (but not limited to) the changing of a thermostat's setpoint temperature, conveniently folded together with the satisfying physical sensation of inward clicking, together with accommodating natural focus on the electronic display in the central midst of their fingers' activity, adds significantly to an intuitive, seamless, and downright fun user experience. Further descriptions of advantageous mechanical user-interfaces and related designs, which are employed according to some embodiments, can be found in U.S. Ser. Nos. 13/033,573, 29/386,021, and 13/199,108, all of which are incorporated herein by reference.

FIGS. 5B and 5C are bottom and right side elevation views of the thermostat 102, which has been found to provide a particularly pleasing and adaptable visual appearance when viewed against a variety of different wall colors and wall textures in a variety of different home environments and home settings. While the thermostat itself will functionally adapt to the user's schedule as described herein and in one or more of the commonly assigned incorporated applications, the outer shape is specially configured to convey a "chameleon" quality or characteristic such that the overall device appears to naturally blend in, in a visual and decorative sense, with many of the most common wall colors and wall textures found in home and business environments, at least in part because it will appear to assume the surrounding colors and even textures when viewed from many different angles.

According to some embodiments, the thermostat 102 includes a processing system 560, display driver 564 and a wireless communications system 566. The processing system 560 is adapted to cause the display driver 564 and display 516 to display information to the user, and to receiver user input via the rotatable ring 512. The processing system 560, according to some embodiments, is capable of carrying out the governance of the operation of thermostat 102 including various user interface features. The processing system 560 is further programmed and configured to carry out other operations as described further hereinbelow and/or in other ones of the commonly assigned incorporated applications. For example, processing system 560 is further programmed and configured to maintain and update a thermodynamic model for the enclosure in which the HVAC system is installed, such as described in U.S. Ser. No. 12/881,463, and in International Patent App. No. PCT/US11/51579, both of which are incorporated herein by reference. According to some embodiments, the wireless communications system 566 is used to communicate with devices such as personal computers and/or other thermostats or HVAC system components, which can be peer-to-peer communications, communications through one or more servers located on a private network, or and/or communications through a cloud-based service.

According to some embodiments, for ease of installation, configuration and/or upgrading, especially by a non-expert installer such as a user, the thermostat 102 includes a head unit 540 and a backplate (or wall dock) 542. As is described hereinabove, thermostat 102 is wall mounted and has circular in shape and has an outer rotatable ring 512 for receiving user input. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit(s) or from a common wire, if available, as described in further detail in co-pending patent application U.S. Ser. Nos. 13/034,674, and 13/034,678, which are incorporated by reference herein. According to some embodiments, rechargeable battery 522 is a single cell lithium-ion, or a lithium-polymer battery.

Figure 6A:
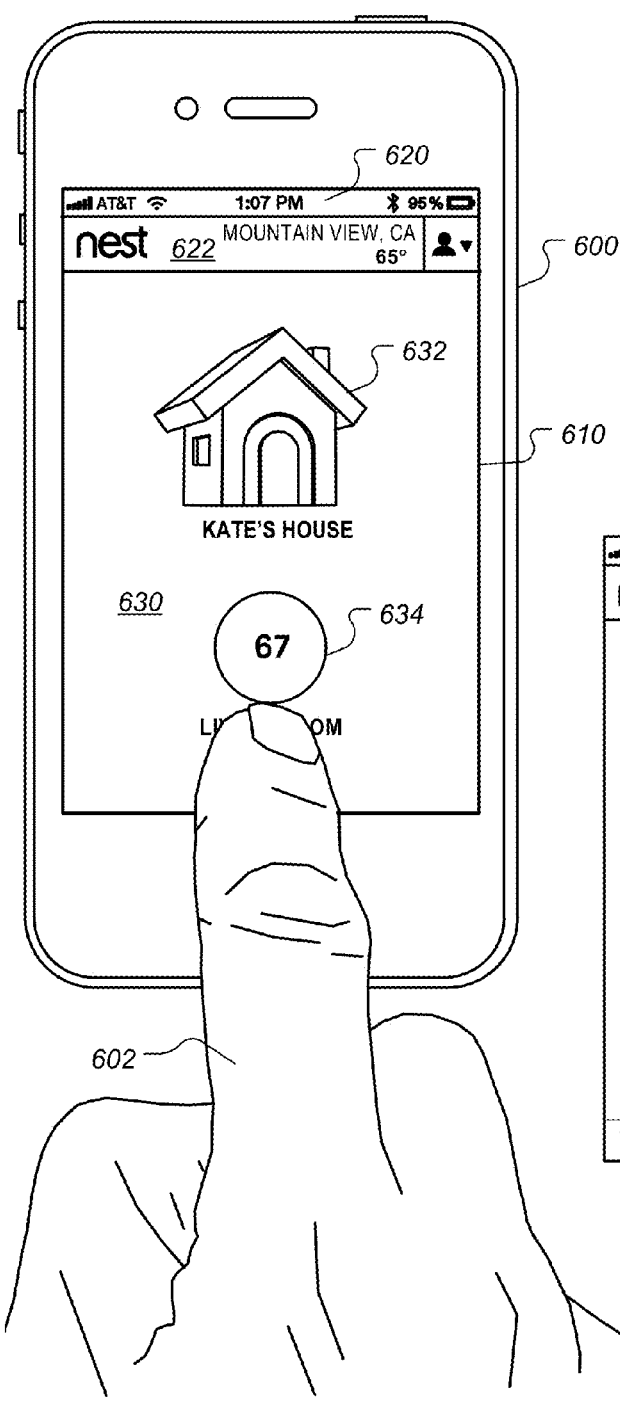
FIGS. 6A-6P illustrate aspects of a graphical user interface on small format touch-screen device for a network connected programmable thermostat, according to some embodiments.
Figure 6B:
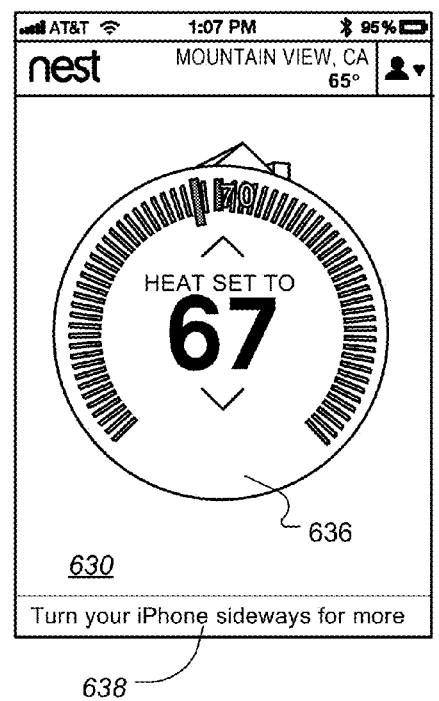
Figure 6C:
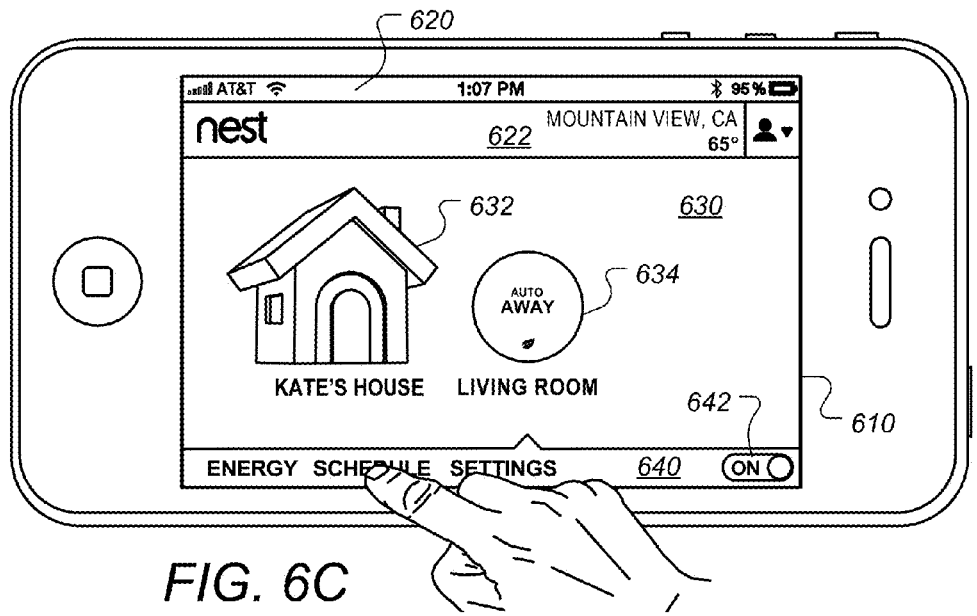
Figure 6D:
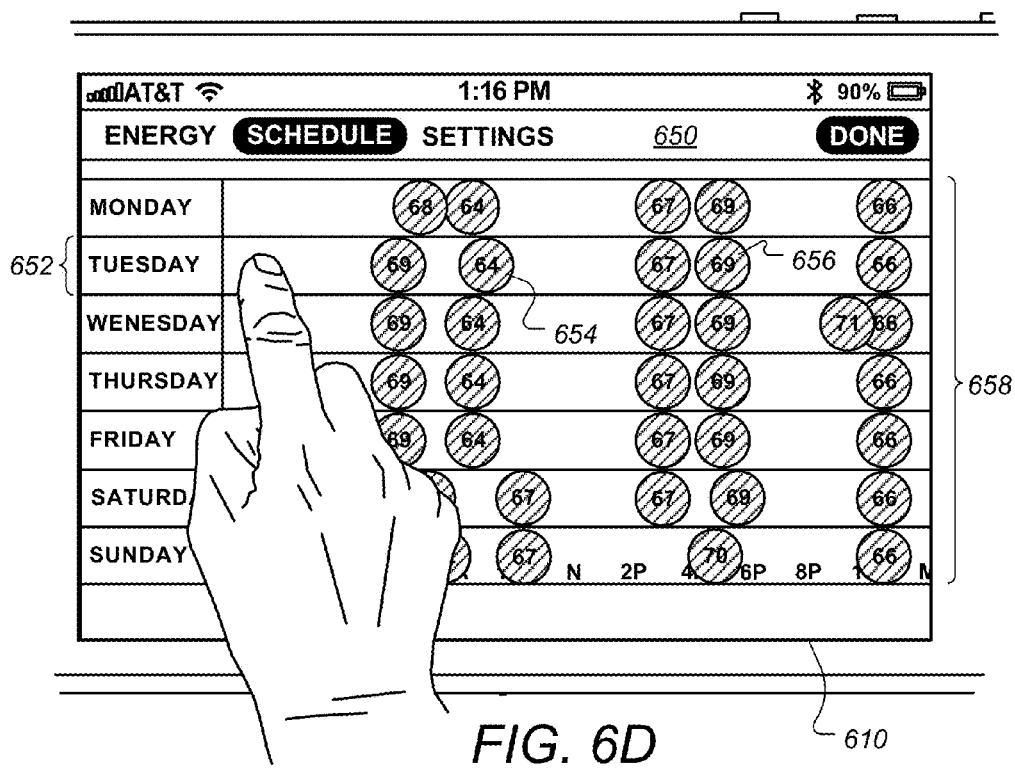
Figure 6E:
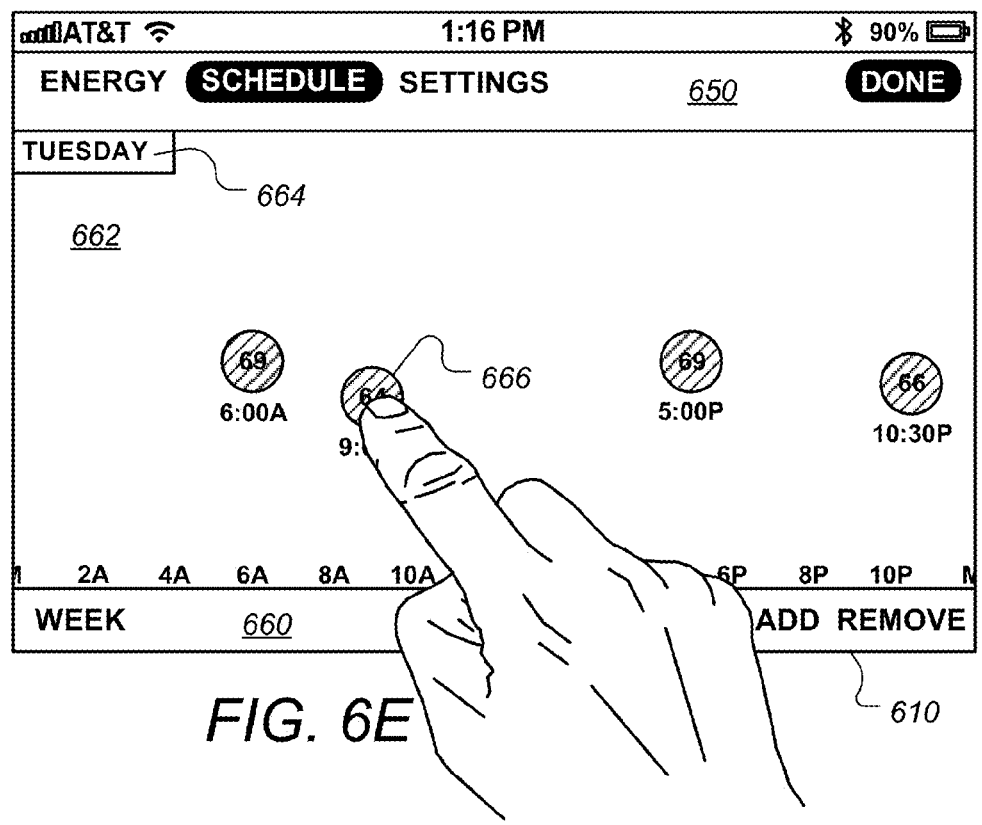
Figure 6F:
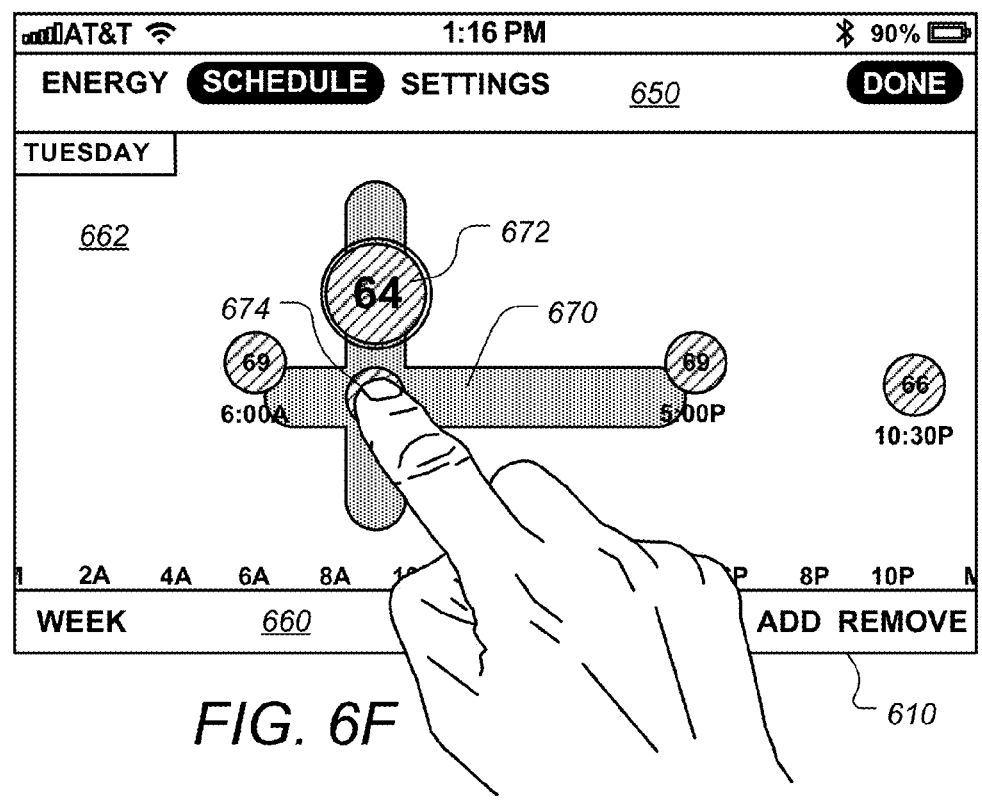
Figure 6G:
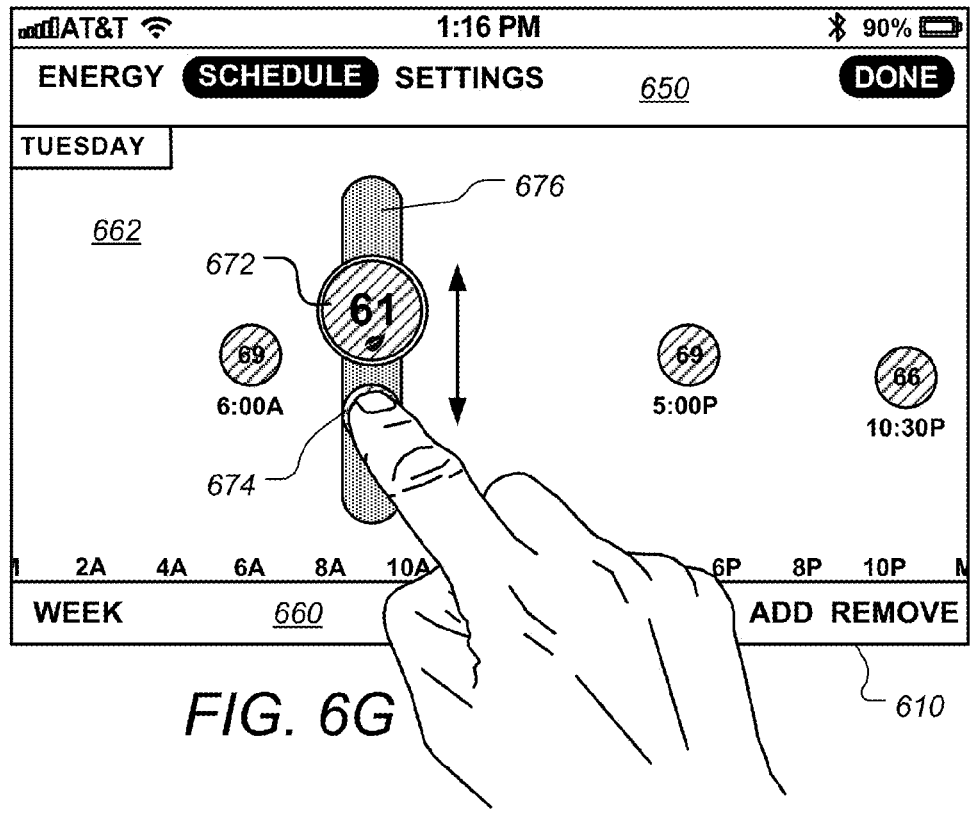
Figure 6H:
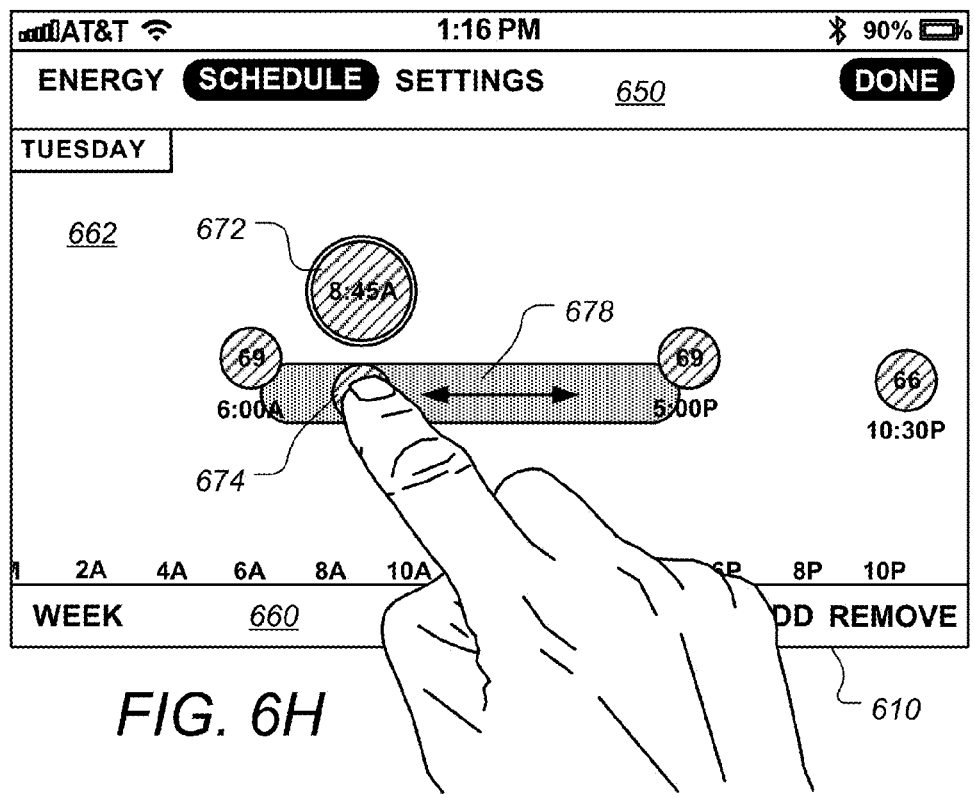
Figure 6I:
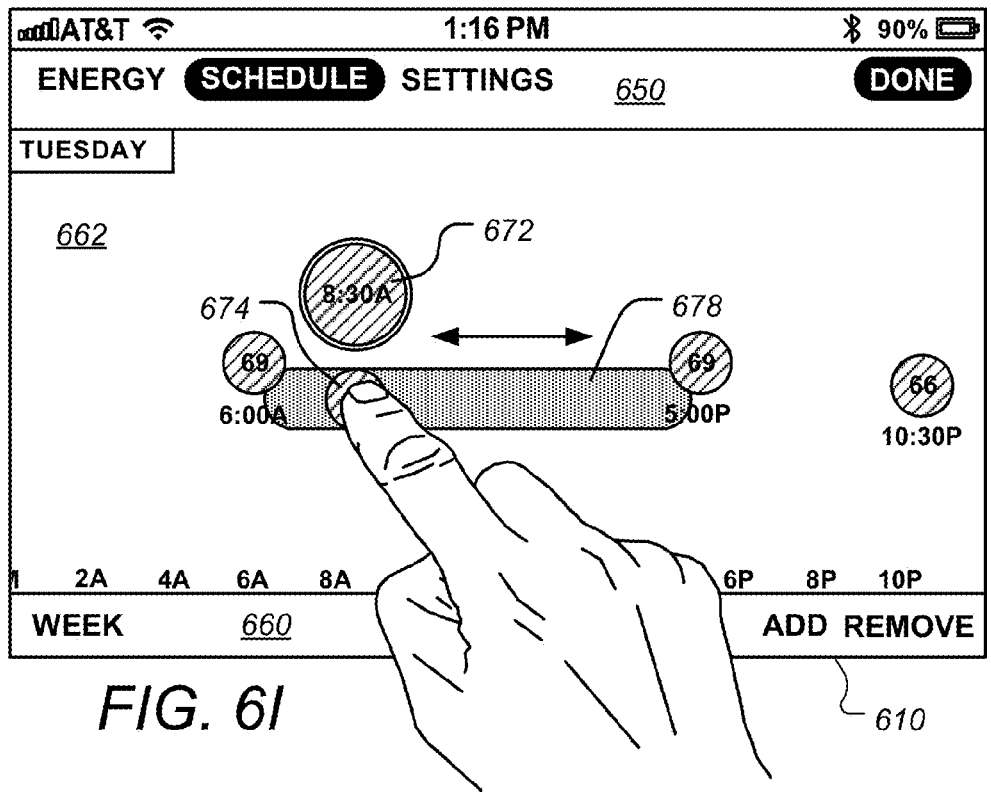
Figure 6J:
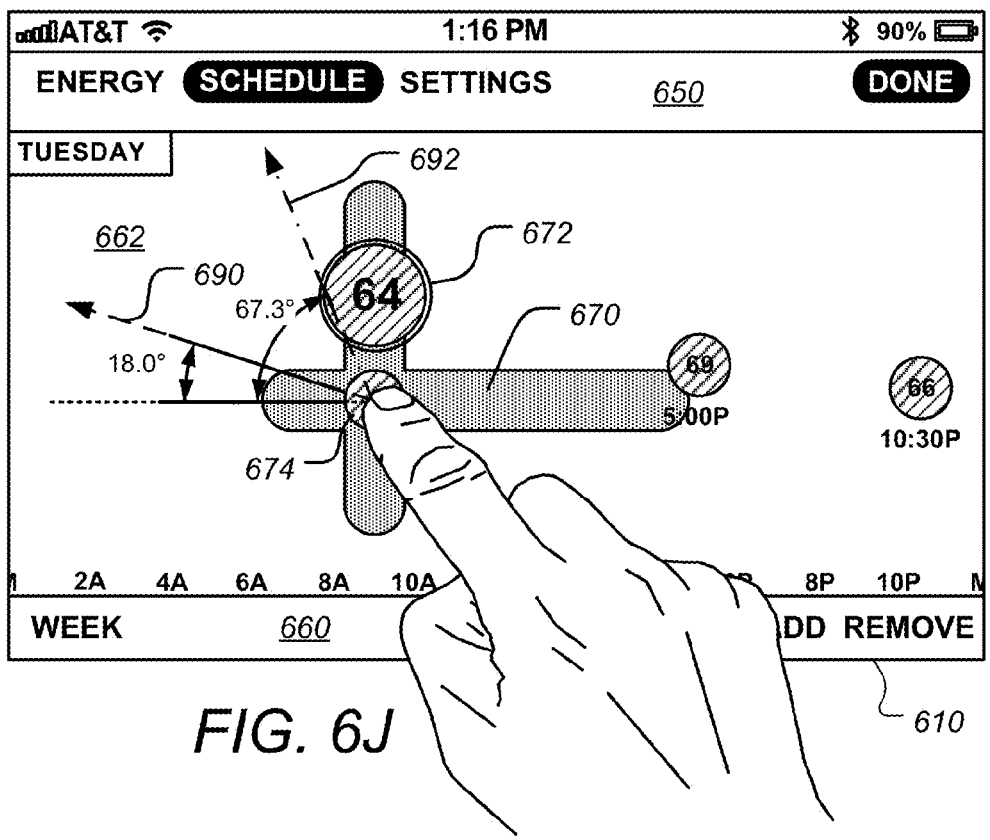
Figure 6K:
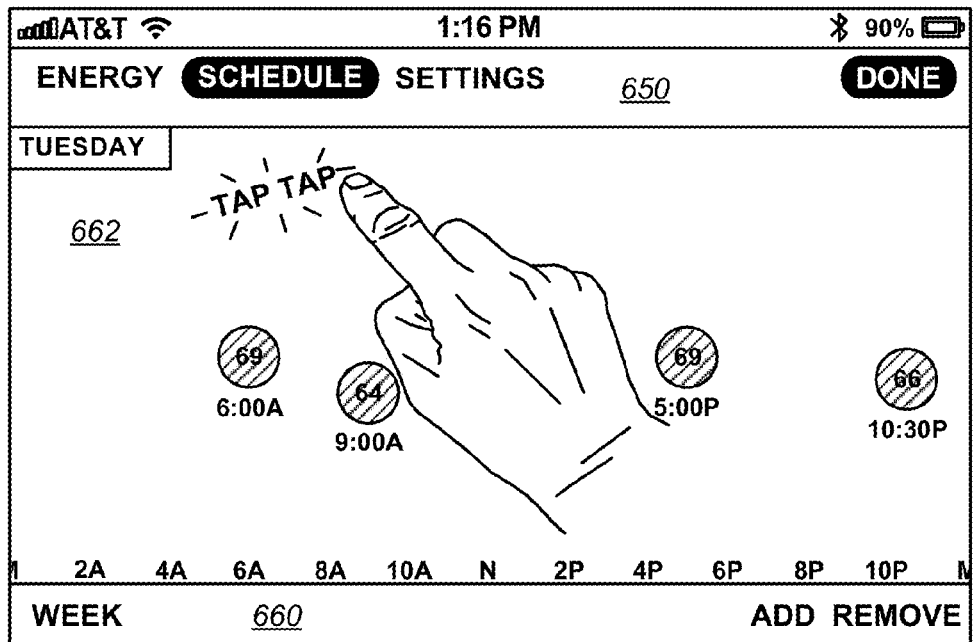
Figure 6L:
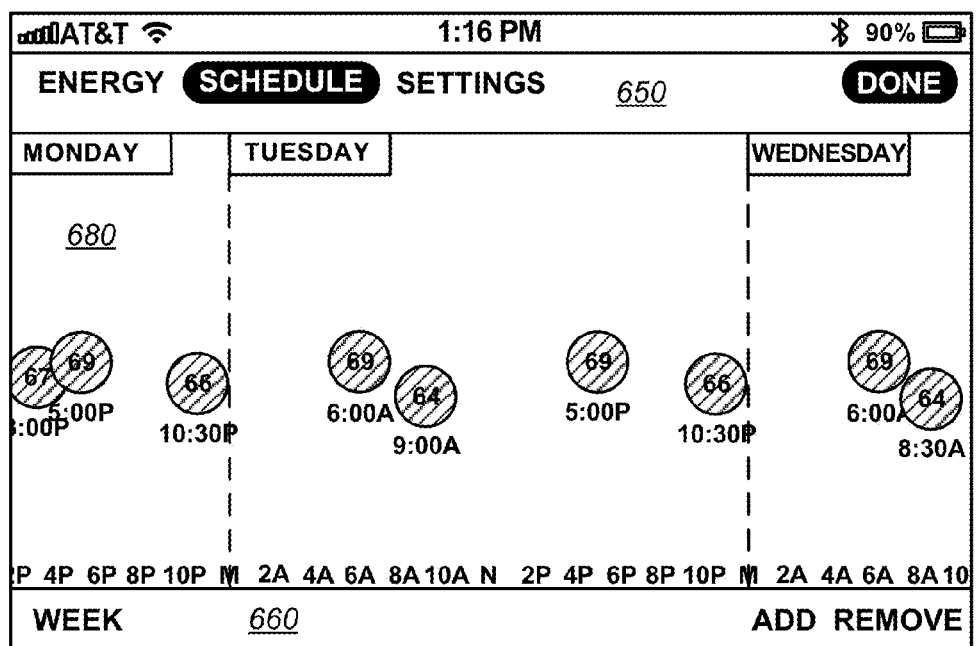
Figure 6M:
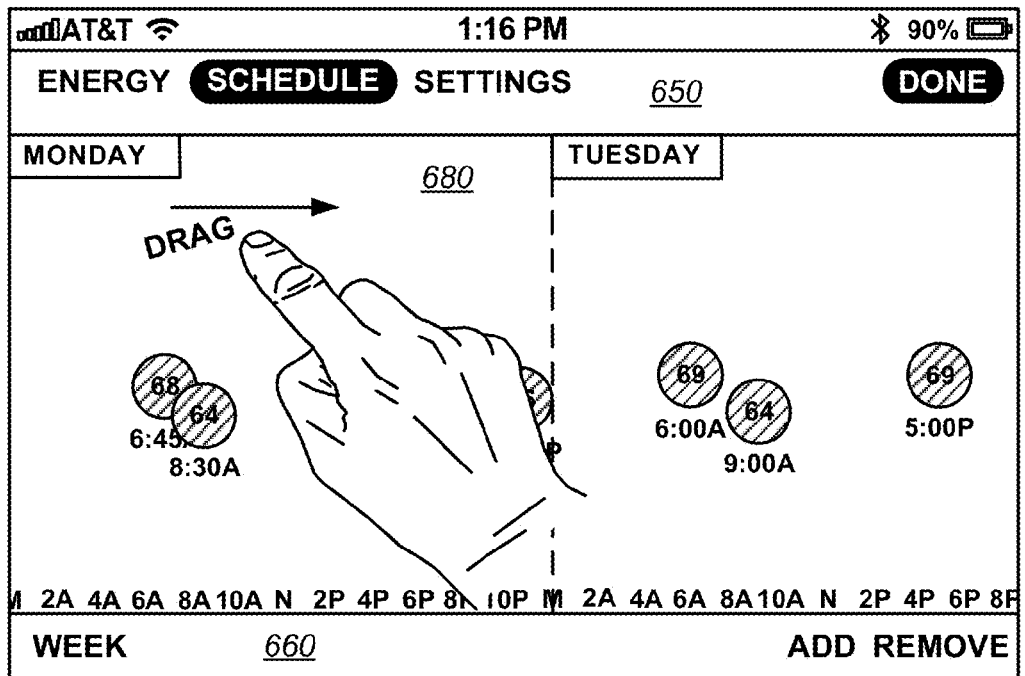
Figure 6N:
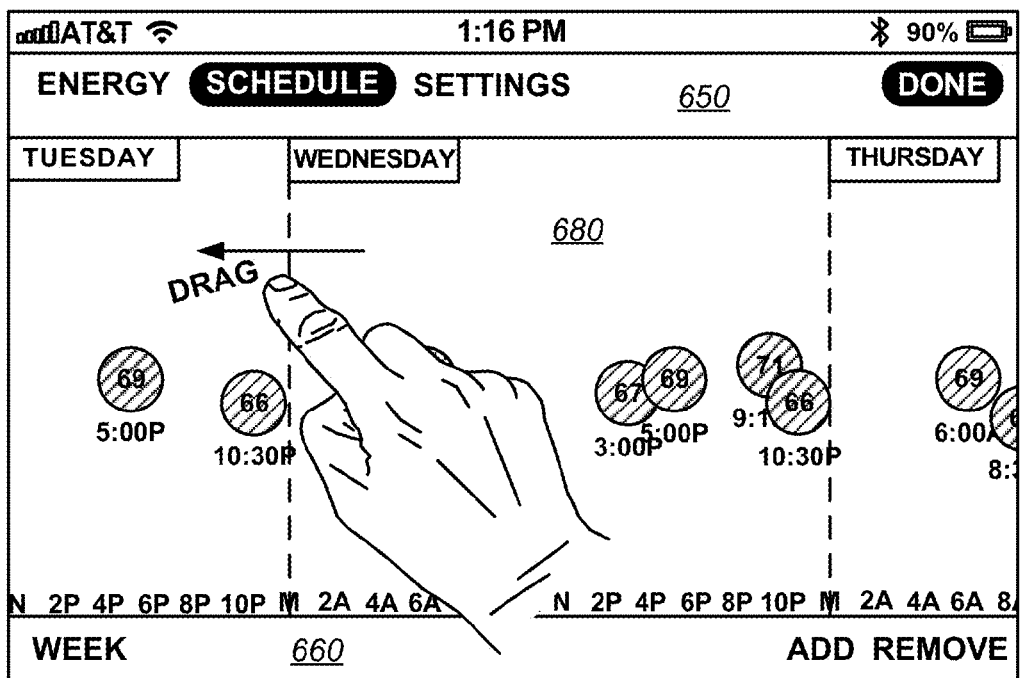
Figure 6O:
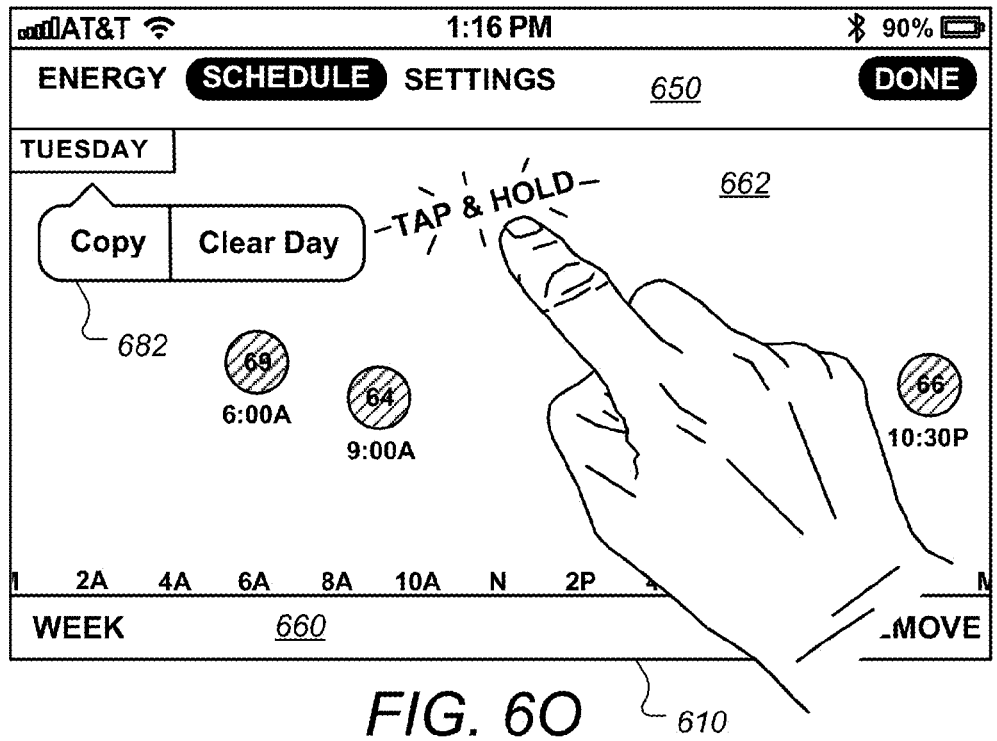
Figure 6P:
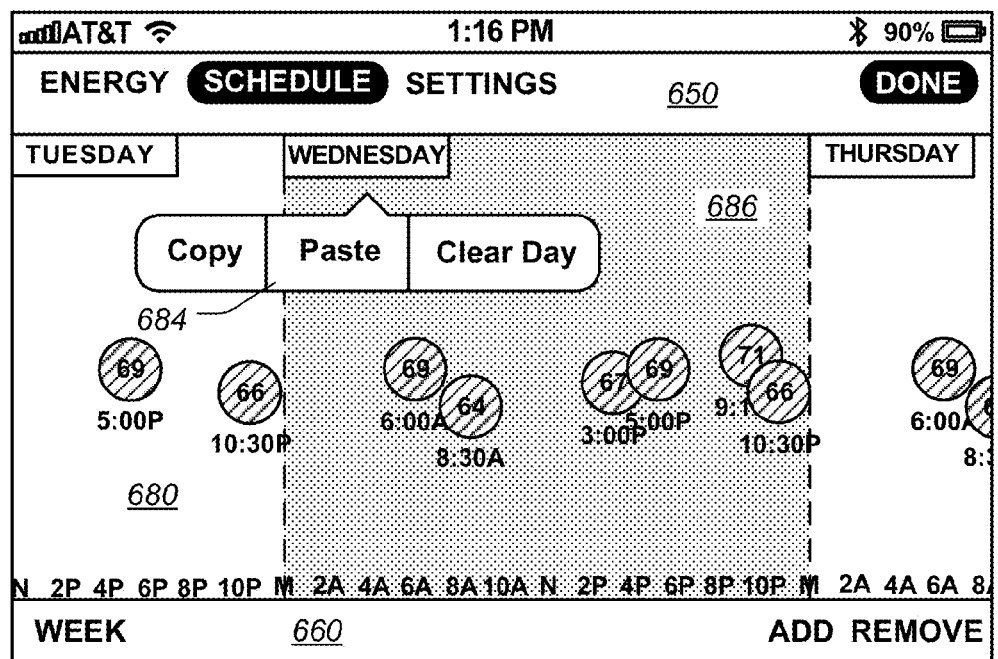

FIGS. 6A-6P illustrate aspects of a graphical user interface on small format touch-screen device for a network connected programmable thermostat, according to some embodiments. In FIG. 6A, smartphone 600 is shown as an iPhone 4s running the Apple iOS operating system, although according to other embodiments the smartphone 600 could be a different device running a different operating system such as Android, Symbian, RIM, or Windows operating systems. Smart phone 600 has a touch sensitive display 610 on which various types of information can be shown and from which various types of user input can be received. For the example shown of an iPhone 4s, the display 610 is 3.5 inches measured diagonally. However, other smartphones may have slightly smaller, or larger displays, for example the iPhone 5 (4 inch diagonal), Samsung Galaxy S3 (4.8 inch diagonal), and Samsung Galaxy Note (5.3 inch diagonal). In any case the relatively small size of the smartphone touch screen display presents a challenge when designing a user-friendly interface. Note that while the user's hand 602 is shown in FIG. 6A to scale, in subsequent drawings, the user's hand is shown smaller in order not to overly obscure the features being described herein.

The display area shows a top information bar 620 that is generated by and is standard to the operating system of the phone 600. In FIGS. 6A and 6B, the smart phone is oriented in a portrait orientation, such that the long edge of the display 610 is vertically oriented. An upper banner are 622 includes information such as the thermostat manufacture's logo, as well as the city name and current outdoor temperature for the location where the user's thermostat is installed. A main window area 630 shows a house symbol 632 with the name assigned in which thermostat is installed. A thermostat symbol 634 is also displayed along with the name assigned to the thermostat. For further details of user interfaces for remote devices such as smartphone 600, see co-pending U.S. patent application Ser. No. 13/317,423, and 13/434, 560, both of which are incorporated herein by reference. In response to a user touching the thermostat icon 634, an animated transition is made to display icon 636 which is larger than the icon 634 and is configured to mimic the display on the thermostat represented, including the current temperature shown in large central numerals, as well as the current setpoint temperature shown on a circular arrangement of tickmarks. For further details on aspects of the graphical user interface of thermostats, see U.S. Patent Publication No. 2012/0130546 A1, as well as commonly-assigned U.S. Pat. No. 8,195,313, both of which are incorporated by reference herein. When oriented in a portrait mode, according to some embodiments, a notification 638 is displayed that informs the user that further user interface features are available in landscape mode. When the user turns the smartphone 600 sideways, the screen transitions to a screen such as shown in FIG. 6C.

In FIG. 6C, a lower menu bar 640 has an arrow shape that points to the symbol to which the displayed menu applies. In the example shown in FIG. 6C, the arrow shape of menu 640 is pointed at the thermostat symbol 634, indicating that the menu items, namely: Energy, Schedule, and Settings, pertain to the thermostat named "living room." Menu 640 also includes an on/off toggle button 642 from which the user can turn off or on the thermostat. When the "Schedule" menu option of selected from menu 640 in FIG. 6C by the user, the display 610 transitions to that shown in FIG. 6D. In FIG. 6D, an upper menu area 650 mimics the menu 640 in FIG. 6C and provides the user location information within the menu structure as well as provides a convenient means for the user to navigate within the menu structure. The central display area 658 shows the various programmed setpoint temperatures laid out in a calendar format in which each row represents a day of the week, such as row 652 representing the setpoints for each Tuesday. For each day of the week, individual setpoints are represented by a colored disk with numerals indicating the setpoint temperature. The disk's horizontal position indicates the time of day that the setpoint becomes active, with the time labels being shown near the bottom of display area 658. The colors of the disks indicate the type of HVAC function associated with the setpoint. According to some preferred embodiments, an orange color is associated with heating setpoints and a blue color is associated with cooling setpoints. To example setpoint icons 654 and 656 are shown for Tuesday. Note that in this example the schedule is a weekly schedule which is intended to repeat each week. According to some other embodiments, other types of program schedules can be accommodated by the user interface techniques described herein, including daily, by-weekly, monthly, seasonal, etc.

If the user wants to see more detail for a particular day of the week, the user touches somewhere on the row for that day. For example in FIG. 6D a user is touching the row 652 for Tuesday. Note that according to some embodiments, the user can touch the label "Tuesday" or anywhere else on the row 652 to transition to a more detailed view for that day, which is shown in FIG. 6E. In FIG. 6E the central area 662 displays setpoints for the day of the week, Tuesday, on a detailed two-dimensional graph in which the horizontal axis represents the time of day the setpoint becomes active and the vertical axis represents the temperature associated with the setpoint. As in the case of FIG. 6D, each setpoint disk has numerals indicating the setpoint temperature, as well as a color indicating the type of HVAC function (e.g. heating or cooling) associated with the setpoint. Also shown in FIG. 6E is a lower menu area 660 that includes menu items "WEEK" for returning to the weekly display as shown in FIG. 6D, "ADD" for adding a new setpoint; and "REMOVE" for removing an existing setpoint. For further details of user interface features relating to such schedule displays on remote devices, see U.S. patent application Ser. No. 13/275, 311, filed Oct. 17, 2011, and U.S. Patent Application Publication No. 2012/0191257 A1, both of which are incorporated by reference herein.

When a user wishes to adjust a programmed setpoint (i.e. either adjusting the time or the setpoint temperature associated with the setpoint), the user touches and holds the disk icon for the setpoint. In FIG. 6E, the user wishes to adjust setpoint 666 and is therefore touching that disk. In response, as shown in FIG. 6F, a setpoint modification user interface mode is activated. A large disk 672 is displayed directly above the original setpoint disk position. The large disk 672 initially shows in larger numerals the setpoint temperature currently associated with that setpoint (prior adjustment). Since the user's finger tends to block the information on the smaller disk being touched, the larger disk has been found to very helpful. The original disk 666 is replaced by a numberless disk symbol 674, which is now underneath the user's fingertip. A cross-shaped two dimensional direction indicator 670 is displayed, such as by a darker shaded color, to indicated to the user that either the time or the temperature can be modified simply by a dragging motion with the user's finger. When editing a setpoint, it has been found that allowing the user to simply touch and drag the displayed setpoint disk icon is both intuitive and user friendly. Importantly, it has been found that in the vast majority of cases, when a user wishes to modify a setpoint, it is either to the time or the temperature of the setpoint, but not to both. Furthermore it has been found that for small format touch screen displays such as with a smart phone or tablet computer, when the user intends to modify only time or temperature, it is quite easy for the user to accidentally modify the other parameter. This is because on a small format touch screen device, relatively small movements can be used to make significant changes in the setpoint temperature and/or time. For example, on a smart phone display such as shown in FIG. 6F, if the user intends to make a change in the setpoint temperature, the user will make a dragging gesture in a vertical direction. However if the dragging motion is even slightly diagonal rather then perfectly vertical, the user may accidentally also change the setpoint time by 15 minutes or more. Similarly, if the user intends to make a change in the setpoint time, the user will make a dragging gesture in a horizontal direction. However, if the dragging motion is even slightly diagonal rather than perfectly horizontal, the user may accidentally also change the setpoint temperature by one or more degrees. Accordingly, according to preferred embodiments, the user's adjustments to a setpoint are constrained to either time or temperature depending on a determination of the user's intent.

If the user wishes to adjust the temperature of the setpoint 666, the user will make a dragging gesture, without lifting the finger off the screen 610, in an upwards direction to increase the setpoint temperature and in a downwards direction to decrease the setpoint temperature. The user interface application (e.g. the mobile app) senses the vertical motion quickly transitions the screen to that shown in FIG. 6G, which will only allow changes to temperature and not to time. Note that the cross-shaped two-dimensional direction indicator 670 of FIG. 6F is replaced by a vertical slider indictor 676 to indicate to the user that only temperature can be adjusted. Note that the large disk symbol 672 displays in real time the new setpoint temperature. When the user's desired new setpoint is shown in disk 672, the user releases their finger from screen 610 and the new temperature is adopted for the setpoint, and the screen transitions to a format shown in FIG. 6E. According to some embodiments, the setpoint temperature can be adjusted in increments of either one degree Fahrenheit, or half of one degree Celsius. According to some embodiments, a leaf symbol is displayed when the new setpoint would be worth of the leaf symbol, for example according to one or more algorithms such as described in co-pending U.S. patent application Ser. No. 13/434,560 filed Mar. 29, 2012, which is incorporated herein by reference.

However, starting again from FIG. 6F, if the user wishes to modify the time associated with the setpoint (i.e. the time of day that the setpoint becomes active), user makes a dragging gesture to the right to make the setpoint activate later, or to the left to make the setpoint activate earlier. As soon as the user begins to drag their finger in a vertical direction, a determination is made that the user intends to modify the setpoint temperature and the screen is quickly transitioned to the screen as shown in FIG. 6H, which will only allow changes to time and not to temperature. Note that the cross-shaped two-dimensional direction indicator 670 of FIG. 6F is replaced by a horizontal slider indictor 678 to indicate to the user that only the time can be adjusted. According to some embodiments, the setpoint time can be adjusted in increments of 15 minutes. Note that the disk 672 now displays the new time to be associated with the setpoint. When the user sees the new desired time in disk 672, such as shown FIG. 6I, where the user wishes to the new setpoint time to be 8:30 AM, the user simply releases their finger from screen 610 and the new time is adopted for the setpoint, and the screen transitions to a format shown in FIG. 6E. Note that in the rather uncommon case that a user wishes to modify both time and temperature for a setpoint, this can still be accomplished by first modifying one parameter and then the other as described.

FIG. 6J shows aspects in determining a user's intention in adjusting a setpoint, according to some embodiments. To determine which parameter, time or temperature, the user wishes to adjust, the initial motion of the dragging gesture by the user's finder is analyzed. According to one embodiment, if the user's initial finger movement is within 45 degrees of a vertical direction, such as the case of direction arrow 692, it is determined that the user intends to adjust the setpoint temperature, and if the user's initial finger movement is within 45 degrees of a horizontal direction, as in the case of direction arrow 690, then it is determined that user intends to adjust the setpoint time. Other methods of determining can also be used, such as asking the user, in cases the initial movement is close to 45 degrees.

FIG. 6K-6N show further aspects of a thermostat graphical user interface implemented on a small-format touch screen device, according to some embodiments. When the user double taps anywhere in the central area 662 of a single-day two-dimensional setpoint plot, such as shown in FIG. 6K, a transition is smoothly and quickly made to a multi-day two-dimensional setpoint plot such as shown in FIG. 6L, where central area 680 has a more compressed time scale than area 662 of the single-day plot shown in FIG. 6K, such that it includes slightly less than 48 hours of setpoint information. A multi-day display can be useful, for example, when the user wishes to look setpoints or compare setpoints between several different days of the week. According to some embodiments, as shown in FIGS. 6M and 6N, a dragging gesture anywhere in the central area 680 scrolls the time line of the multi-day plot so that the user can quickly and intuitively view and modify (using the same procedure shown in FIGS. 6E-6J) setpoints from various days of the week. According to some embodiments, the dragging-to-scroll functionality illustrated in FIGS. 6M and 6N are also operable when viewing a single-day plot such as in FIG. 6K, and works in the same way except that the time scale is not compressed an still only shows 24 hours at at time.

FIGS. 6O and 6P show further aspects of a thermostat graphical user interface implemented on a small-format touch screen device, according to some embodiments. It has been found that many times a user makes detailed adjustments to all the setpoints of a given day of the week, and subsequently wishes to copy and paste those setpoints to one or more other days of the week. For example a good program schedule for Tuesday may also be a good for the other weekdays, namely Monday, Wednesday, Thursday and Friday. In such cases cutting and pasting setpoints from one day to another can easily be accomplished as shown in FIGS. 6O and 6P. By tapping and holding anywhere in a two-dimensional plot such as the single-day plot shown in FIG. 6O, an option is given to "Copy" all the setpoints. According to some embodiments, all the setpoints for the day can be deleted using the "Clear Day" option. After a "Copy" option has been selected, the user can navigate to a the two-dimensional plot of a different day (for example using the double tap and drag gestures as shown in FIGS. 6K-6N, or simply the dragging gesture). Then single tapping on any other day highlights that day (such as by shading the area corresponding to that day as shown in FIG. 6P), and the option 684 to "Paste" the previously copied setpoints is given as shown in FIG. 6P.

Figure 7A:
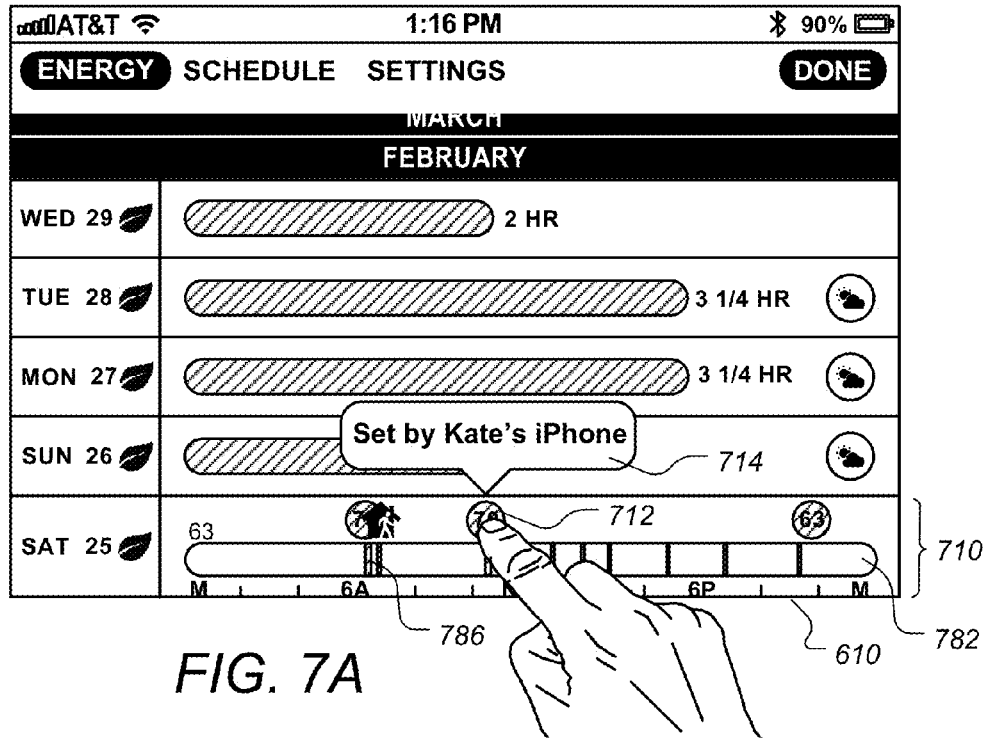
FIGS. 7A-7D show aspects of a thermostat graphical user interface implemented on a small-format touch screen device pertaining to responsibility for setpoint changes and other events, according to some embodiments.
Figure 7B:
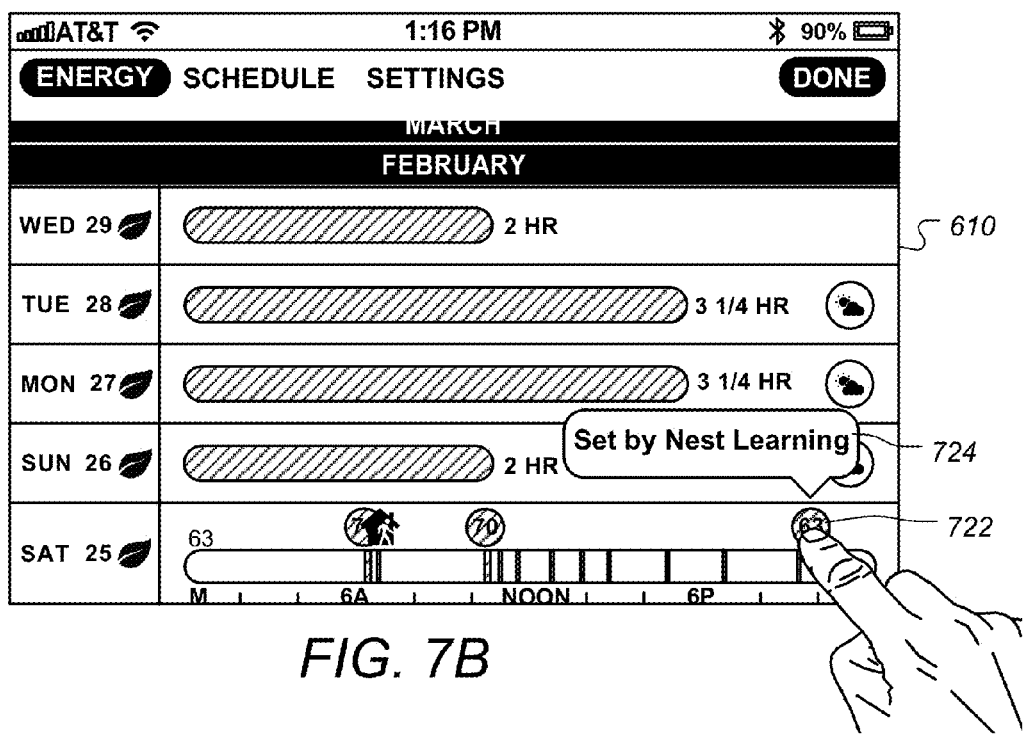
Figure 7C:
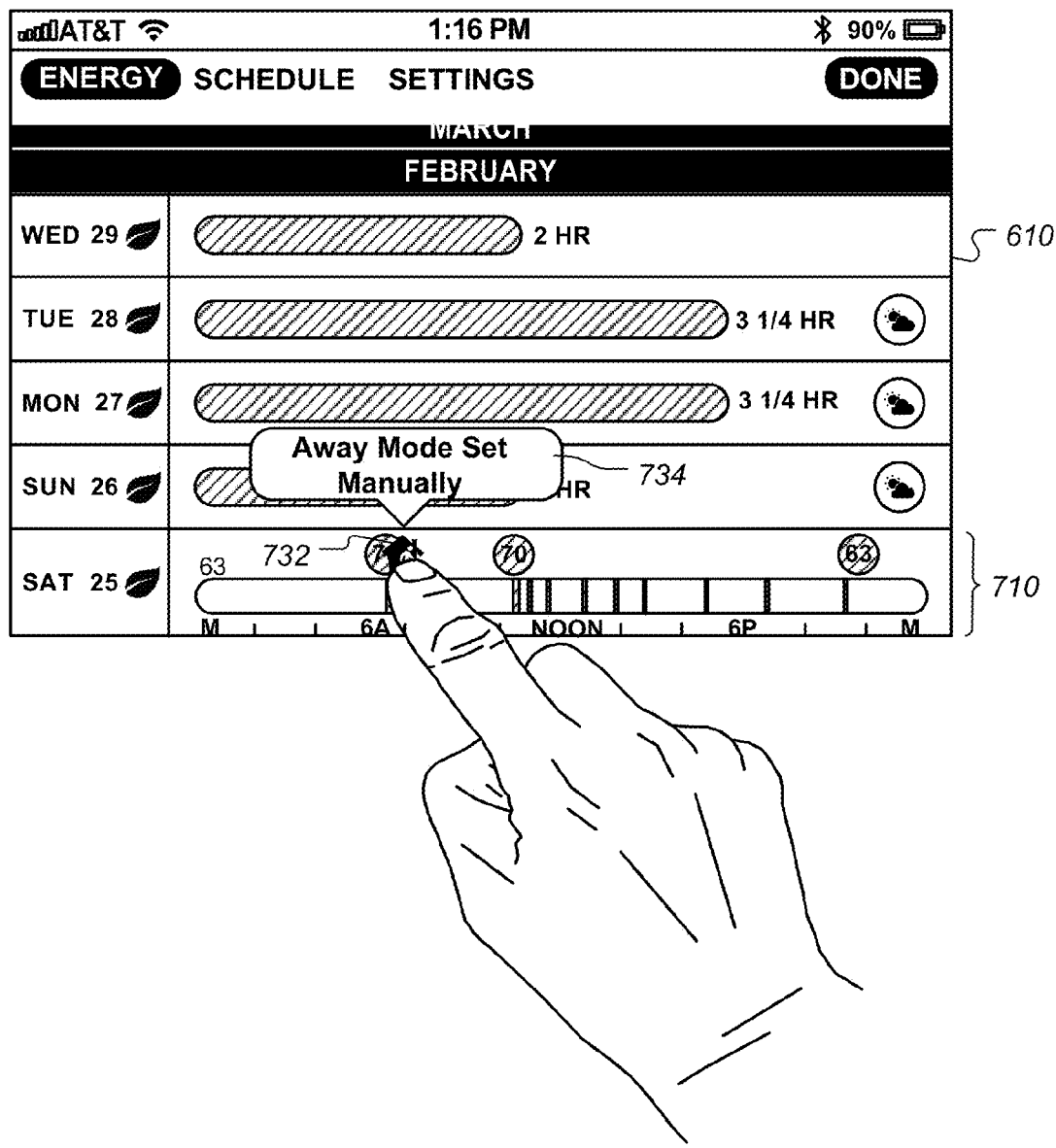

FIGS. 7A-7D show aspects of a thermostat graphical user interface implemented on a small-format touch screen device pertaining to responsibility for setpoint changes and other events, according to some embodiments. Shown in FIG. 7A is a detailed energy information screen, such as described in further detail in co-pending U.S. patent application Ser. No. 13/434,560, filed Mar. 29, 2012, which is incorporated by reference herein. Shown in the detailed time-line area 710 is a time-line bar 782 for the entire day with hash marks or symbols for each two hours. The main bar 782 is used to indicate the times during the day and duration of each time the HVAC function was active. The color of the horizontal activity bar, such as bar 786 matches the HVAC function being used, and the width of the activity bar corresponds to the time of day during which the function was active. According to some embodiments the thermostat and HVAC system are capable of up to three stages of heating and two stages of cooling, and the activity bars are color coded to show which stages were active during which times. For example, progressively more saturated colors or orange-red can be used for each more power stage of heat, such as salmon for first stage heat, orange for second stage heat and red-orange for third stage heat. Likewise light and dark blue can be used for first and second stage cooling respectively.

Figure 7D:
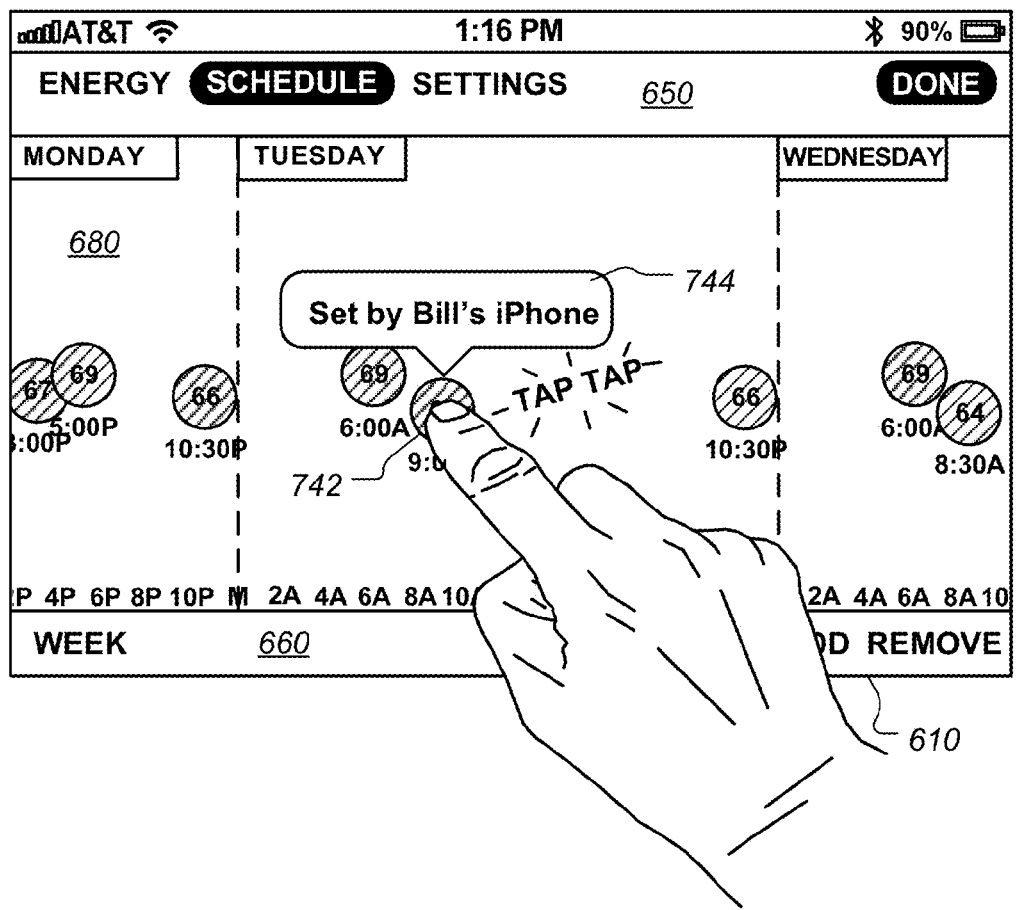

Also shown on the detailed time-line area 710 are a number of event symbols such as setpoint disk 712 which indicates that setpoint of 70 degrees was activated at about 11 AM on Saturday, February $25^{th}$. According to some embodiments, touching the event symbol 712 by the user activate an information bubble 714 that shows the user information as to the setpoint. In this case, the setpoint was set using a mobile app. on a smartphone identified as "Kate's iPhone." In the case shown in FIG. 7B, the event symbol 722 represents a setpoint of 63 degrees. The user's selection of the setpoint 722 causes the information bubble 724 to be displayed which indicates that that setpoint was set by "Nest Learning" which is an automated learning algorithm that can set and adjust setpoints to enhance comfort as well as cost savings. For further detail on learning algorithms for establishing and/or adjusting setpoints based on either real-time manual adjustments (meaning the user wishes to adjust the current temperature) and non-real-time manual adjustments (meaning the user wishes to adjust a programmed setpoint), see, U.S. Provisional Patent Application Ser. No. 61/550, 346, filed Oct. 21, 2011, and International Patent Publication No. WO 2012/068591, both of which are incorporated herein by reference. In the example shown in FIG. 7C, the away event symbol is selected by the user, which causes the information bubble 734 to be displayed. In this case the away mode was set manually by a user. In other cases an away mode can be initiated by an "auto-away" algorithm such as described in further detail in U.S. Patent Application Publication No. US 2012/0186774 A1, which is incorporate by reference herein. In such cases the information bubble can read, for example "Away Mode Set Automatically by Auto-Away." While the setpoints shown in the historical energy display of FIGS. 7A-7B were actual setpoints that were either scheduled or manually initiated, according to some embodiments, similar information can be displayed for scheduled setpoints. Shown in FIG. 7D is a two-dimensional setpoint plot. In response to the user double tapping a setpoint disk 742, the information bubble 744 is displayed that indicates that a smart phone identified as "Bill's iPhone" was used to create, or most recently modify that setpoint.

Figure 8B:
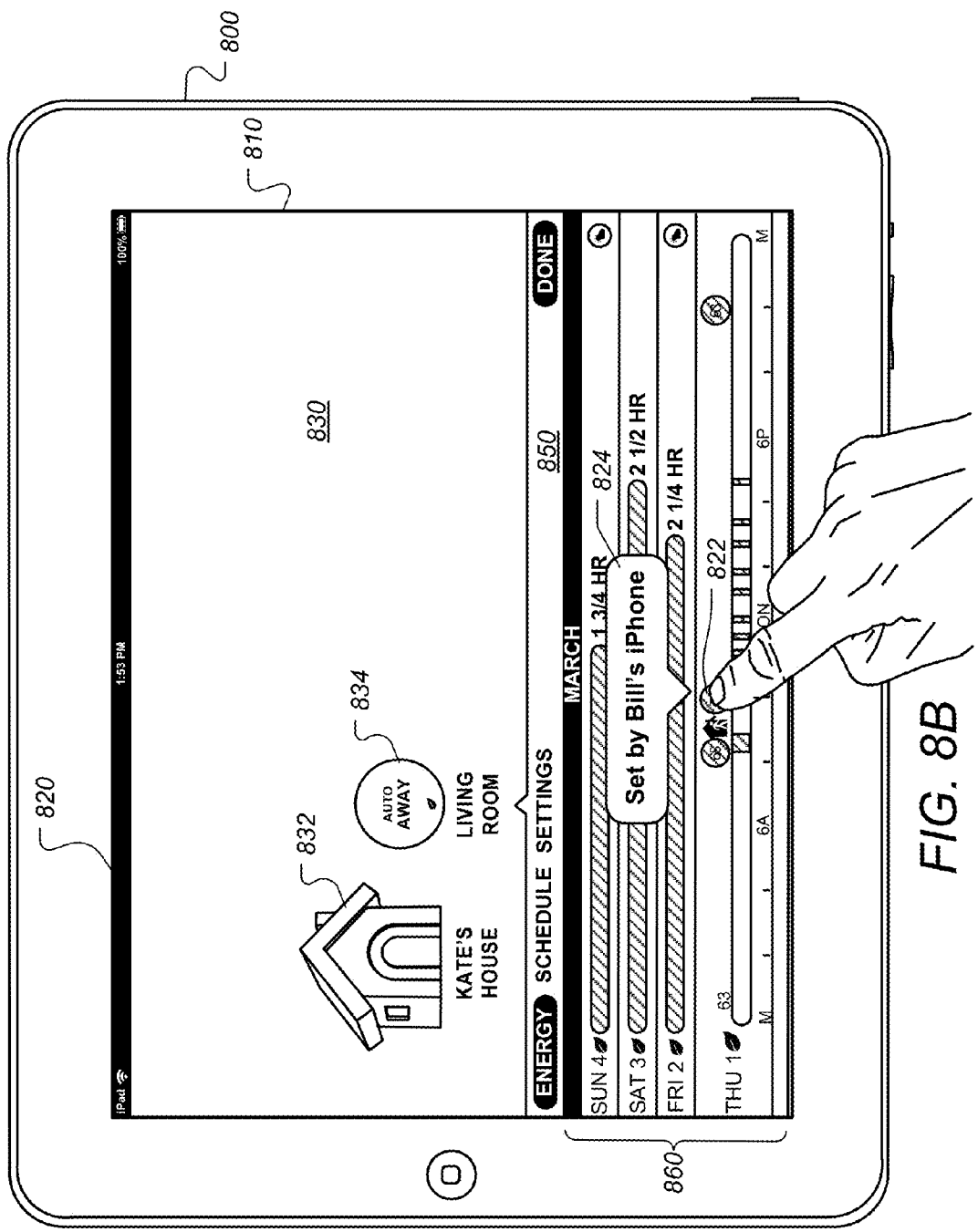

FIGS. 8A-8B show aspects of a thermostat graphical user interface implemented on a tablet computer with a touch screen device, according to some embodiments. Each of the features described herein with respect to a smart phone touch screen device, can also be implemented on larger touch screen devices such as a tablet computer. For example, in FIG. 8A, an iPad 800 is running the Apple iOS operating system, although according to other embodiments the tablet 800 could be a different device running a different operating system such as the Android, Blackberry or Windows operating systems. Tablet 800 has a touch sensitive display 810 on which various types of information can be shown and from which various types of user input can be received. The display area shows a top information bar 820 that is generated by and is standard to the operating system of the tablet 800. A main window area 830 shows a house symbol 832 with the name assigned in which thermostat is installed. A thermostat symbol 834 is also displayed along with the name assigned to the thermostat. For further details of user interfaces for remote devices such as tablet 800, see co-pending U.S. patent application Ser. No. 13/317,423, which is incorporated herein by reference. The lower menu bar 850 has an arrow shape that points to the symbol to which the displayed menu applies. In the example shown in FIG. 8A, arrow shape of menu 850 is pointed at the thermostat logo 834, so the menu items, namely: Energy, Schedule, and Settings, pertain to the thermostat named "living room." In the lower display area 862 a two-dimensional setpoint plot is shown wherein the user is making an adjustment to the setpoint symbol at location 874 as shown by the cross-shaped two-dimensional direction indicator 870. A large disk 872 is also displayed as described infra with respect to FIG. 6F. In FIG. 8B, historical energy information is being displayed in the lower area 860. In response to the user selecting a setpoint event symbol 822, the information bubble 824 is displayed that indicates the setpoint was set by a smart phone identified as "Bill's iPhone."

Although the concepts relating to user interfaces for small format touch screens have been thus far described with respect to a thermostat, according to some embodiments these concepts are applicable beyond the immediate environment of HVAC to the smart home as a whole, as well as to network-based ecosystems within which the invention may be applicable. Other applications in a smart home setting, such as shown in FIG. 1, for the described small format touch screen settings using constrained variables includes: irrigation settings (where a user may want to edit either days of the week and watering time on a small format touch screen display), as well as home electronics settings such as televisions, stereos, etc.

Applications in a smart home, such as shown in FIG. 1, for the described setpoint responsibility indicator includes other settings where it would useful for a user to know who and/or when a settings was established or adjusted. Such applications include pool/spa heater adjustments, and settings with appliances such as refrigerators and/or freezers.

Various modifications may be made without departing from the spirit and scope of the invention. It is to be further appreciated that the term thermostat, as used hereinabove and hereinbelow, can include thermostats having direct control wires to an HVAC system, and can further include thermostats that do not connect directly with the HVAC system, but that sense an ambient temperature at one location in an enclosure and cooperatively communicate by wired or wireless data connections with a separate thermostat unit located elsewhere in the enclosure, wherein the separate thermostat unit does have direct control wires to the HVAC system. Accordingly, the invention is not limited to the above-described embodiments, but instead is defined by the appended claims in light of their full scope of equivalents.

What is claimed is:

1. A method of interactively and graphically displaying programmed setpoint information to a user of an HVAC system controlled by a thermostat, the method comprising:

receiving and storing, by a mobile device, information indicating that a first setpoint change in a setpoint schedule was made on a user interface of the thermostat;

receiving and storing, by the mobile device, information indicating that a second setpoint change in the setpoint schedule was made by a first identified user;

displaying, on a display of the mobile device, a graphical daily summary of thermostat information for each of a plurality of days, the graphical daily summary including at least a first setpoint icon representing the first setpoint and a second setpoint icon representing the second setpoint;

receiving, by the mobile device, a selection of the displayed first setpoint icon;

displaying, on the display of the mobile device, information indicating that the first setpoint was changed by the user interface of the thermostat;

receiving, by the mobile device, a selection of the displayed second setpoint icon: and displaying, on the display of the mobile device, information indicating that the second setpoint was changed by the first identified user.

2. The method according to claim 1 wherein a plurality of predefined ways in which setpoints can be generated and/or adjusted includes one or more of the following selected from a group consisting of: by a user on the thermostat, by a user on the mobile device, by a user using a web application, and by an automated learning algorithm.

3. The method according to claim 2 wherein a way in which the first setpoint was generated and/or adjusted is by a user on a mobile device, and the displayed information indicating the way in which the first setpoint was generated and/or adjusted includes an identification of a name associated with the mobile device.

4. The method according to claim 1 wherein the graphical daily summary includes a displayed away symbol indicating the thermostat activated an away mode, the method further comprising in response to receiving a selection of the displayed away symbol, displaying information indicating to the user whether the away mode was initiated by a user or automatically.

5. The method according to claim 1 wherein the mobile device comprises a smart phone.

6. The method according to claim 1 wherein the mobile device comprises a tablet computer.

7. The method according to claim 1 wherein the mobile device comprises part of personal computer system running a web-based application.

8. A non-transitory electronic storage medium comprising instructions that, when executed by one or more processors, cause the one or more processors to perform operations comprising:
   receiving and storing, by a mobile device, information indicating that a first setpoint change in a setpoint schedule was made on a user interface of a thermostat;
   receiving and storing, by the mobile device, information indicating that a second setpoint change in the setpoint schedule was made by a first identified user;
   displaying, on a display of the mobile device, a graphical daily summary of thermostat information for each of a plurality of days, the graphical daily summary including at least a first setpoint icon representing the first setpoint and a second setpoint icon representing the second setpoint;
   receiving, by the mobile device, a selection of the displayed first setpoint icon;
   displaying, on the display of the mobile device, information indicating that the first setpoint was changed by the user interface of the thermostat;
   receiving, by the mobile device, a selection of the displayed second setpoint icon; and
   displaying, on the display of the mobile device, information indicating that the second setpoint was changed by the first identified user.

9. The non-transitory electronic storage medium of claim 8 wherein a plurality of predefined ways in which setpoints can be generated and/or adjusted includes one or more of the following selected from a group consisting of: by a user on the thermostat, by a user on the mobile device, by a user using a web application, and by an automated learning algorithm.

10. The non-transitory electronic storage medium of claim 9 wherein a way in which the first setpoint was generated and/or adjusted is by a user on a mobile device, and the displayed information indicating the way in which the first setpoint was generated and/or adjusted includes an identification of a name associated with the mobile device.

11. The non-transitory electronic storage medium of claim 8 wherein the graphical daily summary includes a displayed away symbol indicating the thermostat activated an away mode, wherein the instructions further cause the one or more processors to, in response to receiving a selection of the displayed away symbol, displaying information indicating to the user whether the away mode was initiated by a user or automatically.

12. The non-transitory electronic storage medium of claim 8 wherein the mobile device comprises a smart phone.

13. The non-transitory electronic storage medium of claim 8 wherein the mobile device comprises a tablet computer.

14. The non-transitory electronic storage medium of claim 8 wherein the mobile device comprises part of personal computer system running a web-based application.

15. A system comprising:
   one or more processors;
   a display device;
   one or more memories comprising instructions that, when executed by the one or more processors, cause the one or more processors to perform operations comprising:
      receiving and storing, by a mobile device, information indicating that a first setpoint change in a setpoint schedule was made on a user interface of a thermostat;
      receiving and storing, by the mobile device, information indicating that a second setpoint change in the setpoint schedule was made by a first identified user;
      displaying, on a display of the mobile device, a graphical daily summary of thermostat information for each of a plurality of days, the graphical daily summary including at least a first setpoint icon representing the first setpoint and a second setpoint icon representing the second setpoint;
      receiving, by the mobile device, a selection of the displayed first setpoint icon;
      displaying, on the display of the mobile device, information indicating that the first setpoint was changed by the user interface of the thermostat;
      receiving, by the mobile device, a selection of the displayed second setpoint icon; and
      displaying, on the display of the mobile device, information indicating that the second setpoint was changed by the first identified user.

16. The system of claim 15 wherein a plurality of predefined ways in which setpoints can be generated and/or adjusted includes one or more of the following selected from a group consisting of: by a user on the thermostat, by a user on the mobile device, by a user using a web application, and by an automated learning algorithm.

17. The system of claim 16 wherein a way in which the first setpoint was generated and/or adjusted is by a user on a mobile device, and the displayed information indicating the way in which the first setpoint was generated and/or adjusted includes an identification of a name associated with the mobile device.

18. The system of claim 17 wherein the graphical daily summary includes a displayed away symbol indicating the thermostat activated an away mode, wherein the instructions further cause the one or more processors to, in response to receiving a selection of the displayed away symbol, displaying information indicating to the user whether the away mode was initiated by a user or automatically.

19. The system of claim 17 wherein the mobile device comprises a smart phone.

20. The system of claim 17 wherein the mobile device comprises part of personal computer system running a web-based application.

\* \* \* \* \*